United States Patent
Kinoshita et al.

(10) Patent No.: US 7,448,189 B2
(45) Date of Patent: Nov. 11, 2008

(54) FILLING APPARATUS

(75) Inventors: Shigehiro Kinoshita, Tokyo (JP); Toshio Moriya, Tokyo (JP); Keiji Yano, Tokyo (JP)

(73) Assignee: Tetra Laval Holdings & Finance, S.A. (CH)

( * ) Notice: Subject to any disclaimer, the term of this patent is extended or adjusted under 35 U.S.C. 154(b) by 0 days.

(21) Appl. No.: 11/249,709

(22) Filed: Oct. 14, 2005

(65) Prior Publication Data

US 2006/0026929 A1   Feb. 9, 2006

Related U.S. Application Data

(62) Division of application No. 10/499,068, filed as application No. PCT/JP02/13606 on Dec. 26, 2002, now Pat. No. 7,007,440.

(30) Foreign Application Priority Data

| Dec. 26, 2001 | (JP) | .......................... 2001-395023 |
| Dec. 27, 2001 | (JP) | .......................... 2001-397219 |
| Dec. 28, 2001 | (JP) | .......................... 2001-400522 |

(51) Int. Cl.
*B65B 9/06* (2006.01)

(52) U.S. Cl. .................. 53/551; 53/52; 493/19

(58) Field of Classification Search ............... 53/51–53, 53/64, 65, 72, 75, 76, 550–552; 493/19, 493/20, 23
See application file for complete search history.

(56) References Cited

U.S. PATENT DOCUMENTS

| 4,067,170 | A | * | 1/1978 | Yates, Jr. ....................... 53/451 |
| 5,767,491 | A | * | 6/1998 | Ohlsson et al. ............. 219/633 |
| 6,397,557 | B1 | * | 6/2002 | Bassissi et al. ................. 53/51 |
| 6,666,002 | B1 | * | 12/2003 | Otsuka et al. ................. 53/426 |
| 6,751,925 | B1 | * | 6/2004 | Kinoshita et al. .............. 53/51 |

* cited by examiner

*Primary Examiner*—Hemant M Desai
(74) *Attorney, Agent, or Firm*—Bacon & Thomas, PLLC

(57) ABSTRACT

An object of the present invention is to provide a filling apparatus capable of reliably correcting the position of an overlap portion. The filling apparatus includes a forming ring including a plurality of forming rollers and disposed at a predetermined position along the traveling direction of a packaging material (11) in order to deform the packaging material (11) from a web-like shape to a tubular shape, and a longitudinal sealing device (41) for longitudinally sealing opposite side edges of the tubular packaging material (11). One of the forming rollers includes a flange (71 or 84) which is moved axially by means of a moving mechanism section (72). In this case, even when, within the forming ring, a side edge portion of the packaging material (11) of a certain size impinges on the flange (71 or 84), the flange (71 or 84) is caused to move accordingly to thereby avoid interfering with correction on the position of the overlap portion (LP). Therefore, the position of the overlap portion (LP) can be reliably corrected.

4 Claims, 16 Drawing Sheets

FILLING APPARATUS

This application is a division of application Ser. No. 10/499,068, filed Jun.17, 2004, now U.S. Pat. No. 7,007,440 issued on Mar. 7, 2006, which was filed as a National Phase Application (35 USC 371) of PCT/JP02/13606 filed Dec. 26, 2002 and claims priority of Japanese Application No. 2001-395023 filed Dec. 26, 2001, Japanese Application No. 2001-397219 filed Dec. 27, 2001 and Japanese Application No. 2001-400522 filed Dec. 28, 2001.

TECHNICAL FIELD

The present invention relates to a filling apparatus.

BACKGROUND ART

Conventionally, in production of packaging containers that contain liquid food such as milk or soft drink, a web-like packaging material formed from a flexible laminate material is formed into a tubular shape by means of a preforming apparatus, and the tubular packaging material is sealed and cut at predetermined intervals While being filled with liquid food, thereby yielding brick-like packaging containers.

FIG. 1 is a schematic view of a conventional filling apparatus.

In FIG. 1, reference numeral 11 denotes a web-like packaging material formed from a flexible laminate material. The packaging material 11 is produced by means of an unillustrated packaging-material-producing machine and is set in the form of a reel 12 on a delivery unit 13. The packaging material 11 is delivered by means of the delivery unit 13 and is caused to travel through the filling apparatus by means of a feed apparatus.

While the packaging material 11 is traveling, an unillustrated hole is punched in the packaging material 11, and an unillustrated inner tape and an unillustrated pull tab are affixed to the packaging material 11 in such a manner as to cover the punched hole. Subsequently, the packaging material 11 is caused to travel vertically. While being guided by means of a plurality of forming rings 15 disposed along the traveling direction, the vertically traveling packaging material 11 is formed into a tubular shape such that opposite side edges thereof overlap each other by a predetermined overlap quantity. A portion where the opposite side edges overlap each other; i.e., an overlap portion, is sealed in the longitudinal direction by means of an unillustrated longitudinal sealing device.

While the packaging material 11 is guided by means of a tube guide roller 17, liquid food is supplied from above to the tubular packaging material 11 via a filling pipe 16. Next, while being gripped from opposite sides by means of sealing jaw devices, the packaging material 11 is laterally sealed at predetermined longitudinal intervals and is formed into a pillow-like prototype container 18 through deformation effected by unillustrated forming flaps. The sealing jaw devices constitute a lateral sealing device.

Subsequently, each prototype container 18 undergoes cutting at a laterally sealed portion; i.e., a lateral seal portion, and folding along previously formed folding lines so as to be formed into a predetermined shape, thereby assuming the form of a brick-like packaging container which contains a predetermined amount of liquid food.

The feed apparatus generally includes a pair of nip rollers R1 (FIG. 1 shows only one of the paired nip rollers) disposed adjacent to the delivery unit 13 and adapted to feed the packaging material 11 while nipping the packaging material 11 from front and rear sides; unillustrated crease rollers for forming creases on the packaging material 11 while the same is being rotated; a pair of nip rollers R2 (FIG. 1 shows only one of the paired nip rollers)-disposed at the highest position of the filling apparatus and adapted to feed the packaging material 11 while nipping the packaging material 11 from front and rear sides; and unillustrated engagement portions formed integrally with the corresponding forming flaps and adapted to engage lugs formed on the prototype container 18 in the vicinity of the lateral seal portions so as to move the prototype container 18 and the packaging material 11 forward as the forming flaps move.

The tube guide roller 17 includes at least two support rollers. Each of the support rollers has a predetermined curved surface for guiding the packaging material 11.

Meanwhile, in the filling apparatus, the traveling web-like packaging material 11 can be positioned in a relatively easy manner by means of unillustrated guide members which are formed in correspondence with opposite side edges of the packaging material 11. However, positioning the traveling tubular packaging material 11 is difficult, since the packaging material 11 is curved.

Upon reception of force from the feed apparatus, the tubular packaging material 11 may move in a circumferential direction, with a resultant deviation of the overlap portion from a predetermined position. In order to cope with the problem, an unillustrated movable guide roller, an unillustrated movable forming ring, and the like are disposed along a travel path of the packaging material 11 so as to correct the position of the overlap portion through operation of the movable guide roller, the movable forming ring, and the like.

In this case, the movable guide roller is disposed upstream of the forming rings 15 in the traveling direction of the packaging material 11. Furthermore, the movable forming ring is disposed in the vicinity of a forming ring 15 disposed on the upstream side among the plurality of forming rings 15. Since the packaging material 11 which has undergone correction for the position of the overlap portion is fed to the downstream forming ring 15, the tubular packaging material 11 can travel stably through employment of the following mechanism: among forming rollers of the forming ring 15, a predetermined forming roller has a flange formed thereon, and the flange lightly presses a side edge portion of the packaging material 11.

However, in the conventional filling apparatus, when the packaging material 11 of a certain size is to be corrected for the position of the overlap portion through operation of the movable guide roller, the movable forming ring, and the like, a side edge portion of the packaging material 11 impinges on the flange, and thus the flange interferes with correction on the position of the overlap portion. As a result, an attempt to correct the position of the overlap portion may fail.

Thus, a packaging container is formed while the overlap portion is deviated from the predetermined position.

An object of the present invention is to solve the above-mentioned problem in the conventional filling apparatus and to provide a filling apparatus capable of reliably correcting the position of an overlap portion.

DISCLOSURE OF THE INVENTION

To achieve the above object, a filling apparatus of the present invention comprises a forming ring comprising a plurality of forming rollers and disposed at a predetermined position along the traveling direction of a packaging material in order to deform the packaging material from a web-like shape to a tubular shape, and a longitudinal sealing device for longitudinally sealing opposite side edges of the tubular packaging material.

Selected one of the forming rollers comprises a flange which is moved axially by means of a moving mechanism section.

In this case, even when, within the forming ring, a side edge portion of the packaging material of a certain size impinges on the flange, the flange is caused to move accordingly to thereby avoid interfering with correction on the position of the overlap portion. Therefore, the position of the overlap portion can be reliably corrected.

In another filling apparatus of the present invention, the moving mechanism section is disposed in a reciprocatively movable condition and comprises an operating member linked to the flange.

In a further filling apparatus of the present invention, the operating member extends through a sub-roller which constitutes the selected forming roller.

In still another filling apparatus of the present invention, the operating member is linked to the flange at the outer circumferential surface of a sub-roller which constitutes the selected forming roller.

A still further filling apparatus of the present invention further comprises overlap portion detection processing means for detecting an overlap portion which is formed as a result of longitudinal sealing.

The flange is moved on the basis of a detected position of the overlap portion.

Yet another filling apparatus of the present invention comprises first paper width detection processing means for detecting opposite side edges of a web-like packaging material to thereby determine the width of the web-like packaging material; second paper width detection processing means for detecting opposite side edges of a lateral seal portion to thereby determine the width of the lateral seal portion; and overlap quantity calculation processing means for calculating an overlap quantity on the basis of the width of the web-like packaging material and the width of the lateral seal portion.

In this case, on the basis of opposite side edges of the web-like packaging material detected by the first paper width detection processing means and opposite side edges of the lateral seal portion detected by the second paper width detection processing means, an overlap quantity can be automatically calculated, thereby not only simplifying an operator's work but also avoiding generation of variation in judgment of whether or not an overlap quantity is appropriate, which variation would otherwise be generated due to detection error, variations among operators, etc.

As a result, variations in quality among packaging containers do not arise.

A further filling apparatus of the present invention further comprises overlap quantity modification processing means for operating an overlap quantity modification section on the basis of an overlap quantity determined by the overlap quantity calculation processing means.

A still further filling apparatus of the present invention further comprises first and second edge detecting sections for detecting the corresponding pairs of opposite side edges.

In a still further filling apparatus of the present invention, the first edge detecting section is a rotary body to be pressed against one side edge of the web-like packaging material.

In this case, since the rotary body is pressed against one side edge of the packaging material, meandering of the packaging material can be detected. When the rotary body is moved according to meandering of the packaging material, the second edge detecting section is also moved accordingly, whereby the other side edge can be detected.

Therefore, even when the packaging material meanders, opposite side edges of the packaging material can be stably detected, and thus an overlap quantity can be stably detected.

Yet another filling apparatus of the present invention comprises forming rings disposed at a plurality of positions along the traveling direction of a web-like packaging material in order to deform the web-like packaging material into a tubular shape and configured such that that the packaging material is deformed in an increasing quantity toward downstream along the traveling direction; a longitudinal sealing device for longitudinally sealing opposite side edges of a tubular packaging material; and a moving mechanism for moving a predetermined forming ring among the forming rings along the traveling direction of the packaging material.

In this case, upon variation in overlap quantity, the overlap quantity can be adjusted, whereby not only longitudinal sealing but also lateral sealing can be reliably performed to thereby prevent occurrence of seal defect. Also, the packaging material can be accurately folded along creases, thereby avoiding occurrence of forming defect and improving the appearance of packaging containers.

An overlap quantity can be adjusted merely through movement of a predetermined forming ring. Thus, even when the forming ring is to be manually moved, relevant work can be simplified. Employment of automatic movement can further simplify relevant work.

Since adjustment of overlap quantity does not require replacement of predetermined forming rings, stopping the running filling apparatus is not required. Thus, work for resuming operation of the filling apparatus is not required. Also, in an aseptic-type filling apparatus for producing aseptic packaging containers, sterility can be maintained.

A further filling apparatus of the present invention further comprises an overlap quantity detection device for detecting an overlap quantity of opposite side edges of the packaging material; and overlap quantity adjustment processing means for moving the predetermined forming ring according to a detected overlap quantity.

In a still further filling apparatus of the present invention, the moving mechanism moves the furthermost downstream forming ring among the forming rings.

BEST MODE FOR CARRYING OUT THE INVENTION

Embodiments of the present invention will next be described in detail with reference to the drawings.

Figure 2:
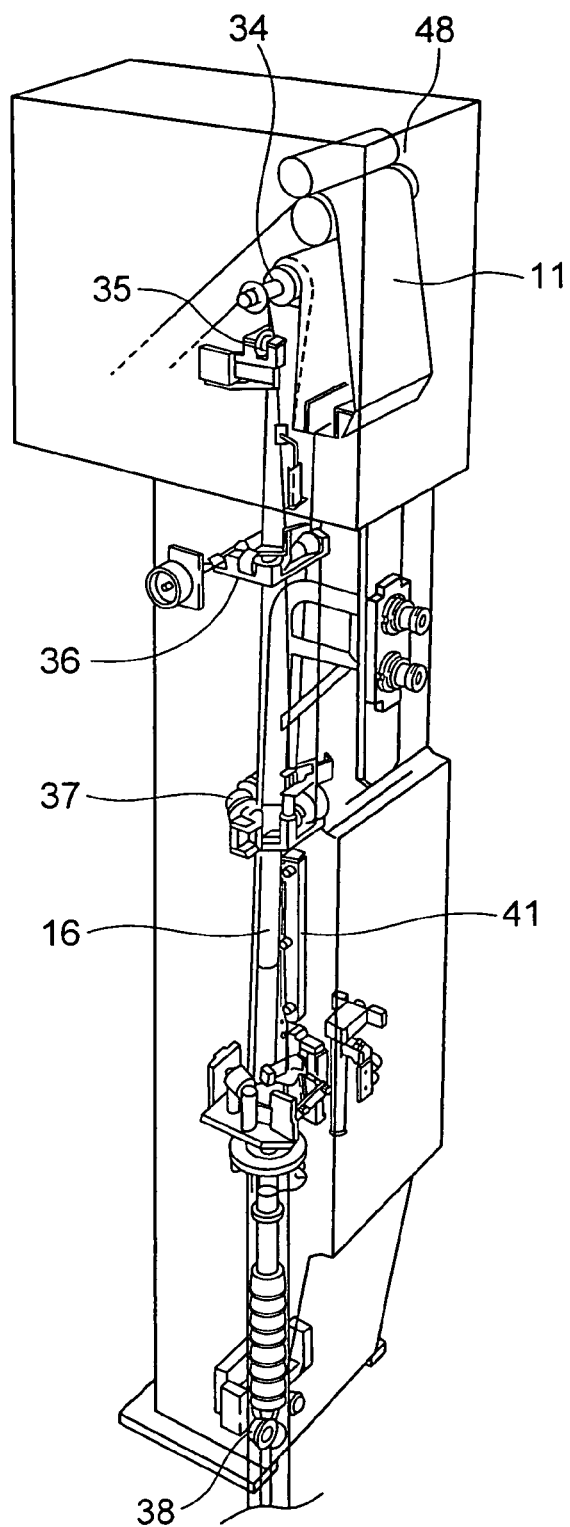
FIG. 2 is a perspective view showing a main portion of a filling apparatus according to a first embodiment of the present invention.
Figure 3:
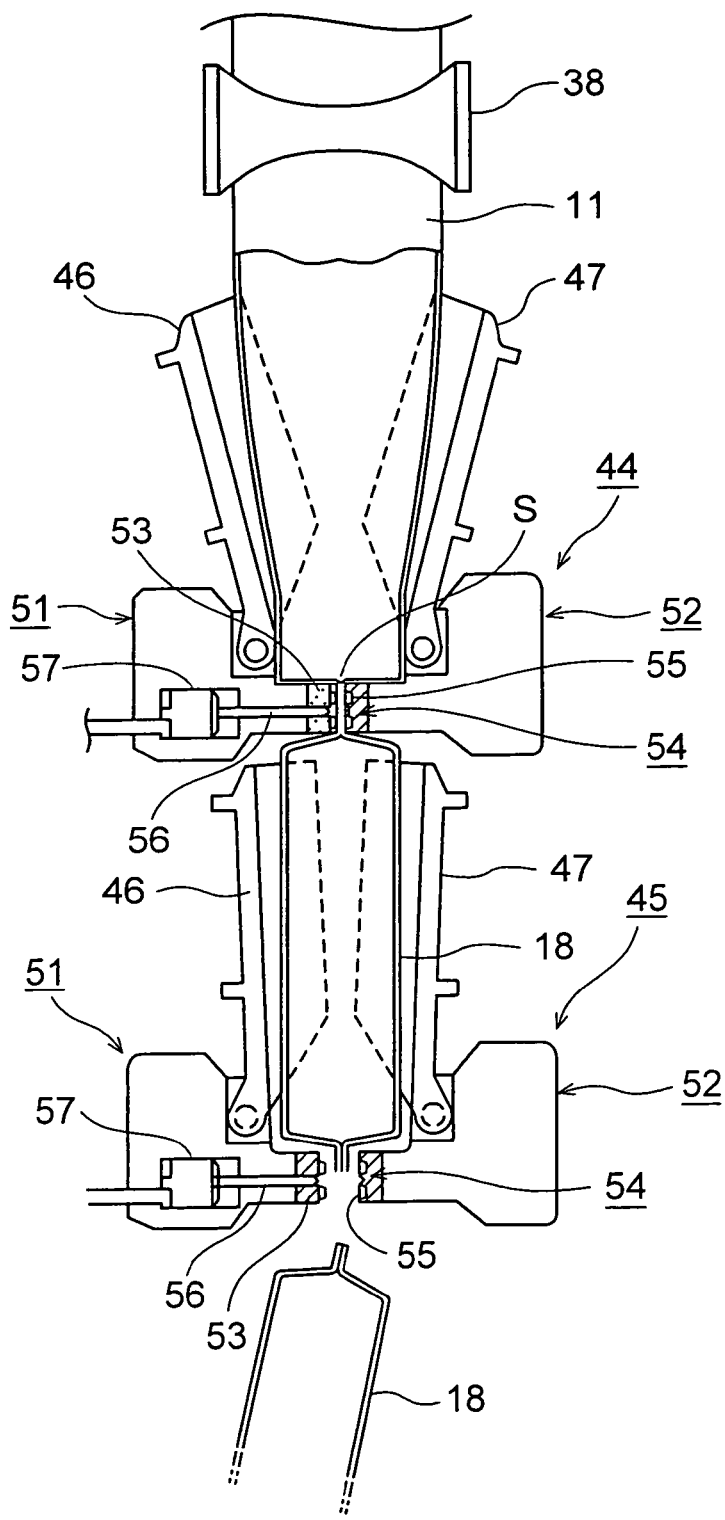
FIG. 3 is a conceptual view showing the operation of sealing jaw devices in the first embodiment of the present invention.

FIG. 2 is a perspective view showing a main portion of a filling apparatus according to a first embodiment of the present invention, and FIG. 3 is a conceptual view showing the operation of sealing jaw devices in the first embodiment of the present invention.

In FIGS. 2 and 3, reference numeral 11 denotes a web-like packaging material formed from a flexible laminated material. The laminated material includes a paper substrate, a resin layer overlying one surface of the paper substrate, an aluminum foil layer overlying the other surface of the paper substrate, and a resin layer overlying the aluminum foil layer. The packaging material 11 is produced by an unillustrated packaging-material production machine; set, in the form of a reel, on an unillustrated delivery unit; delivered by means of the delivery unit; and caused to travel through the filling apparatus by means of a feed apparatus.

While the packaging material 11 is traveling, an unillustrated hole is punched in the packaging material 11, and an unillustrated inner tape and an unillustrated pull tab are affixed to the packaging material 11 in such a manner as to cover the punched hole. Subsequently, as illustrated, the packaging material 11 is caused to travel vertically. The vertically traveling packaging material 11 is guided and deformed into a tubular shape by means of a forming ring disposed at a predetermined position, in the present embodiment, by means of first to fourth forming rings 34-37 disposed at a plurality of positions along the traveling direction. The tubular packaging material 11 is sealed at opposite side edges in the longitudinal direction by means of a longitudinal sealing device 41. For this forming, the first to fourth forming rings 34-37 each have a forming roller which has a predetermined curved surface for deforming the packaging material 11 into a tubular shape. These forming rings deform the packaging material 11 in such a manner that the packaging material 11 is deformed in an increasing quantity toward downstream along the traveling direction.

Subsequently, while the packaging material 11 is guided by means of a tube guide roller 38 disposed downstream of the fourth forming ring 37, liquid food is supplied from above to the packaging material 11 via a filling pipe 16. Next, first and second sealing jaw devices 44 and 45 grip the packaging material 11 from opposite sides, and the packaging material 11 is subjected to lateral sealing, which is performed at predetermined longitudinal intervals. A portion of the packaging material 11 extending along the longitudinal interval is formed into a pillow-like prototype container 18 through deformation effected by forming flaps 46 and 47. Notably, the first and second sealing jaw devices 44 and 45 constitute a lateral sealing device.

Subsequently, each of the thus-formed prototype containers 18 is cut at lateral seal portions. Then, the prototype container 18 undergoes forming along previously formed creases to thereby be formed into a brick-like packaging container that contains a predetermined amount of liquid food.

The feed apparatus generally includes a pair of nip rollers disposed adjacent to the delivery unit and adapted to feed the packaging material 11 while nipping the packaging material 11 from front and rear sides; unillustrated crease rollers for forming creases on the packaging material 11 while the same is being rotated; a pair of nip rollers 48 disposed at the highest position of the filling apparatus and adapted to feed the packaging material 11 while nipping the packaging material 11 from front and rear sides; and unillustrated engagement portions formed integrally with the corresponding forming flaps 46 and 47 and adapted to engage lugs formed on the prototype container 18 in the vicinity of the lateral seal portions so as to move the prototype container 18 and the packaging material 11 forward as the first and second sealing jaw devices 44 and 45 move.

Notably, a preforming apparatus is composed of the first to fourth forming rings 34 to 37, the longitudinal sealing device 41, the tube guide roller 38, and the lateral sealing device, among others.

Next, the first to fourth forming rings 34 to 37 will be described.

The first forming ring 34 assumes a cylindrical shape and inverts the traveling web-like packaging material 11. The second forming ring 35 curves opposite side edges of the web-like packaging material 11; the third forming ring 36 brings the curved opposite side edges of the web-like packaging material 11 to each other such that the packaging material 11 assumes a shape having a substantially elliptical cross section; and the fourth forming ring 37 brings further close to each other the opposite side edges of the packaging material 11 having a substantially elliptical cross section so as to impart a tubular shape to the packaging material 11.

Next, the first and second sealing jaw devices 44 and 45 will be described.

As shown in FIG. 3, each of the first and second sealing jaw devices 44 and 45 has a cutting jaw 51 and a heat seal jaw 52.

In this case, while the packaging material 11 is fed downward in an intermittent manner, the first and second sealing jaw devices 44 and 45 of the same structure are alternatingly operated such that their operating cycles are shifted from each other by half cycle, thereby enhancing the processing speed of the filling apparatus.

The cutting jaw 51 has a cutting bar 53 provided at the front end (at the right-hand end in FIG. 3); the heat seal jaw 52 has a seal block (an inductor insulator) 54 provided at the front end (at the left-hand end in FIG. 3); and the seal block 54 has two inductors 55. The cutting jaw 51 and the heat seal jaw 52 are caused to advance so as to grip the packaging material 11 from opposite sides by means of the cutting bar 53 and the seal block 54. The thus gripped packaging material 11 undergoes lateral sealing at the gripped portion, thereby forming a lateral seal portion S including two seal lines.

A laterally extending flat cutter knife 56 is provided at the center of the cutting jaw 51 in a reciprocatively movable condition (in a condition movable rightward and leftward in FIG. 3). The advancing cutter knife 56 (the cutter knife 56 moving rightward in FIG. 3) cuts the lateral seal portion S at an intermediate position between the two seal lines.

A cylinder 57 is disposed at the rear end (the left-hand end in FIG. 3) of the cutter knife 56 so as to advance and retreat the cutter knife 56 through supply of compressed air or the like to and release the same from the cylinder 57.

Forming flaps 46 and 47 are pivotal attached to the cutting jaw 51 and the heat seal jaw 52, respectively, in such a manner as to surround and guide the packaging material 11, and are adapted to form the packaging material 11 into a pillow-like shape While guiding the packaging material 11.

In FIG. 3, the first sealing jaw device 44 is at the sealing-cutting start position. At the sealing-cutting start position, the first sealing jaw device 44 causes the cutting jaw 51 and the heat seal jaw 52 to advance so as to grip the packaging material 11 from opposite sides, whereby the facing surfaces of the packaging material 11 are brought in contact with each other. Then, while gripping the packaging material 11, the first sealing jaw device 44 moves downward. During the downward movement, the lateral seal portion S is formed, thereby forming the prototype container 18.

In FIG. 3, the second sealing jaw device 45 is at the sealing-cutting end position. Immediately before the second sealing jaw device 45 reaches the sealing-cutting end position, the cutter knife 56 of the second sealing jaw device 45 is caused to advance and cut the lateral seal portion S at an intermediate position between the two seal lines, thereby separating the prototype container 18.

When the lateral seal portion S is cut at an intermediate position between the two seal lines, the cutting jaw 51 and the heat seal jaw 52 of the second sealing jaw device 45 are caused to retreat and then move upward in a gyrating manner to the sealing-cutting start position. When, at the sealing-cutting start position, the second sealing jaw device 45 begins to cause the cutting jaw 51 and the heat seal jaw 52 to advance, the cutter knife 56 of the first sealing jaw device 44 advances and performs cutting at an intermediate position between the seal lines, thereby separating the prototype container 18.

Notably, each of the first and second sealing jaw devices 44 and 45 has an unillustrated cylinder mechanism. At the sealing-cutting start position, compressed air or the like is supplied to the cylinder mechanism in order to draw the cutting jaw 51 and the heat seal jaw 52 to each other, thereby increasing a pressing force involved in sealing.

In the present embodiment, the first and second sealing jaw devices 44 and 45 are used as the lateral sealing device. However, in place of the first and second sealing jaw devices 44 and 45, there may be used an unillustrated lateral sealing device for laterally sealing a tubular packaging material by means of ultrasonic sealing. In this case, the lateral sealing device is configured such that a horn for generating ultrasonic waves and an anvil face each other and grip the packaging material therebetween. Since the packaging material has an overlap portion formed continuously in the longitudinal direction, the packaging material is gripped in the lateral sealing device such that a portion corresponding to the overlap portion has a thickness greater than that of the other portion. Thus, if ultrasonic waves generated at the horn are only transmitted to a portion corresponding to the overlap portion and fail to be transmitted to the entire lateral seal portion, ultrasonic sealing cannot be reliably performed. In order to cope with the problem, a recess for receiving the overlap portion is formed on the anvil so as to uniformly transmit ultrasonic waves to the entire lateral seal portion when the packaging material is gripped between the horn and the anvil.

Since the tubular packaging material 11 has a substantially circular cross section, the traveling tubular packaging material 11 raises difficulty in positioning. When, upon reception of a force from the feed apparatus, the packaging material 11 moves in a circumferential direction, the overlap portion deviates from a predetermined position. When the prototype container 18 is formed into a predetermined shape to thereby complete a packaging container while the overlap portion is deviated from the predetermined position, creases formed beforehand on the packaging material 11 fail to positionally coincide with actual creases, resulting in a poor appearance of the packaging container.

In order to cope with the problem, a CCD that serves as an optical detecting section is disposed at a predetermined position on the travel path of the tubular packaging material 11 so as to detect the overlap portion on the basis of a sensor output from the CCD. On the basis of the result of detection of the overlap portion, one end of an unillustrated movable guide roller disposed on the travel path is moved so as to correct the position of the overlap portion. Also, the first forming ring 34 or the second forming ring 35, whichever is predetermined, serves as a movable forming ring. The movable forming ring is moved so as to correct the position of the overlap portion.

In this case, the movable guide roller is disposed upstream of the first to fourth forming rings 34-37 with respect to the traveling direction of the packaging material 11, and the first and second forming rings 34 and 35 constitute a movable forming ring. Therefore, since, among the first to fourth forming rings 34-37, the downstream third and fourth forming rings 36 and 37 are fed with the packaging material 11 which has undergone correction on the position of the overlap portion, the tubular packaging material 11 can stably travel through employment of the following feature: a flange is formed on a predetermined forming roller among those of the third forming ring 36 and is caused to lightly press a side edge portion of the packaging material 11.

However, when the packaging material 11 of a certain size is to be corrected for the position of the overlap portion through operation of the movable guide roller, the movable forming ring, and the like, a side edge portion of the packaging material 11 impinges on the flange, and thus the flange interferes with correction on the position of the overlap portion. As a result, an attempt to correct the position of the overlap portion may fail. Thus, a packaging container is formed while the overlap portion is deviated from a predetermined position.

In order to cope with the problem, the present embodiment employs the third forming ring 36 capable of moving the flange according to the size of the packaging material 11. The third forming ring 36 will next be described.

Figure 4:
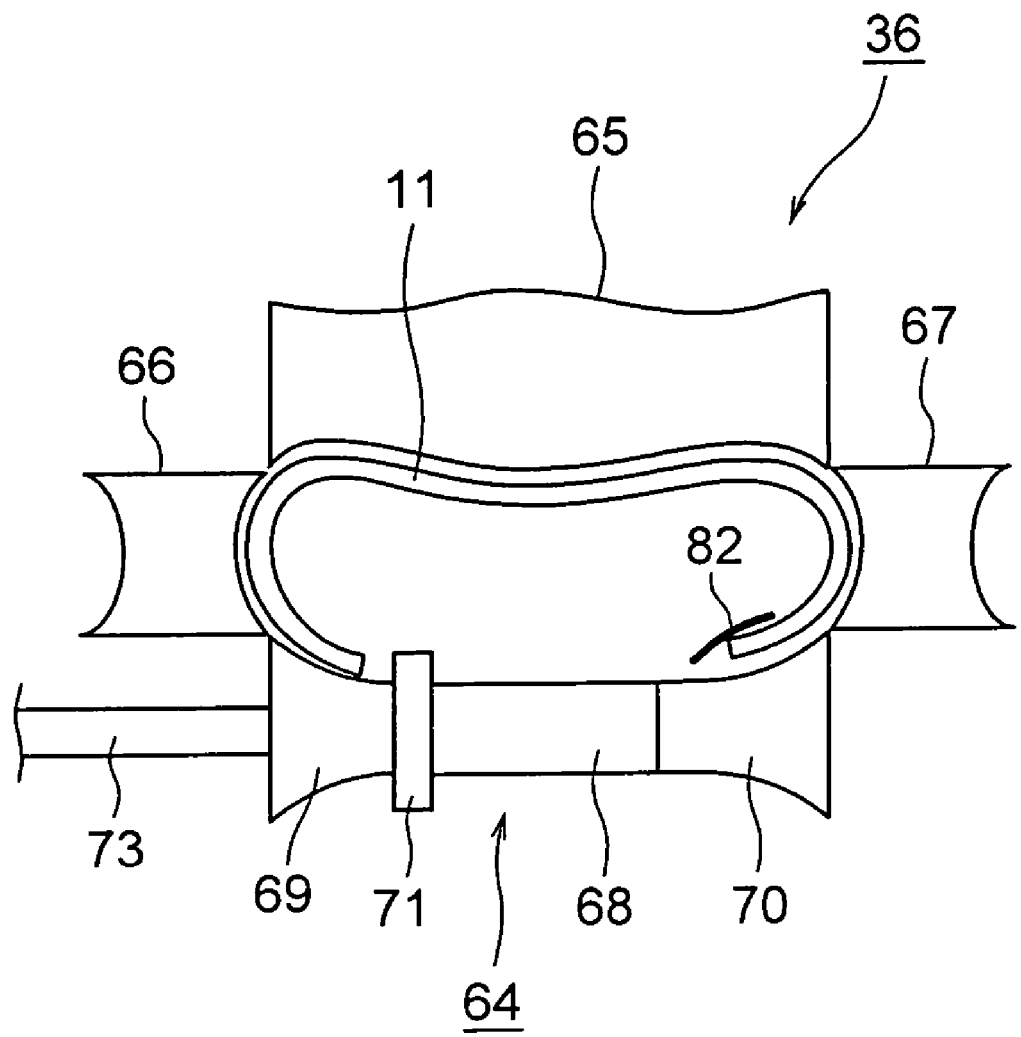
FIG. 4 is a conceptual view of a third forming ring in the first embodiment of the present invention.
Figure 5:
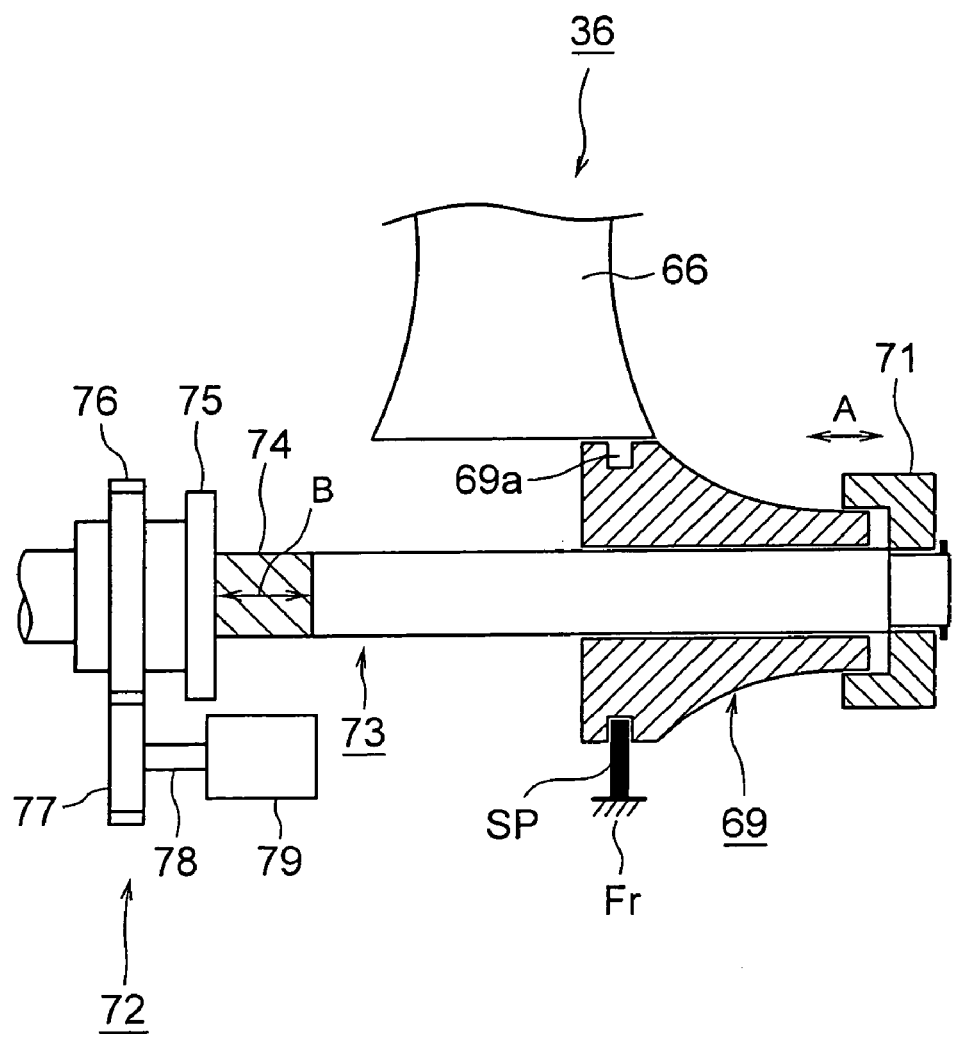
FIG. 5 is a view showing a main portion of the third forming ring in the first embodiment of the present invention.
Figure 6:
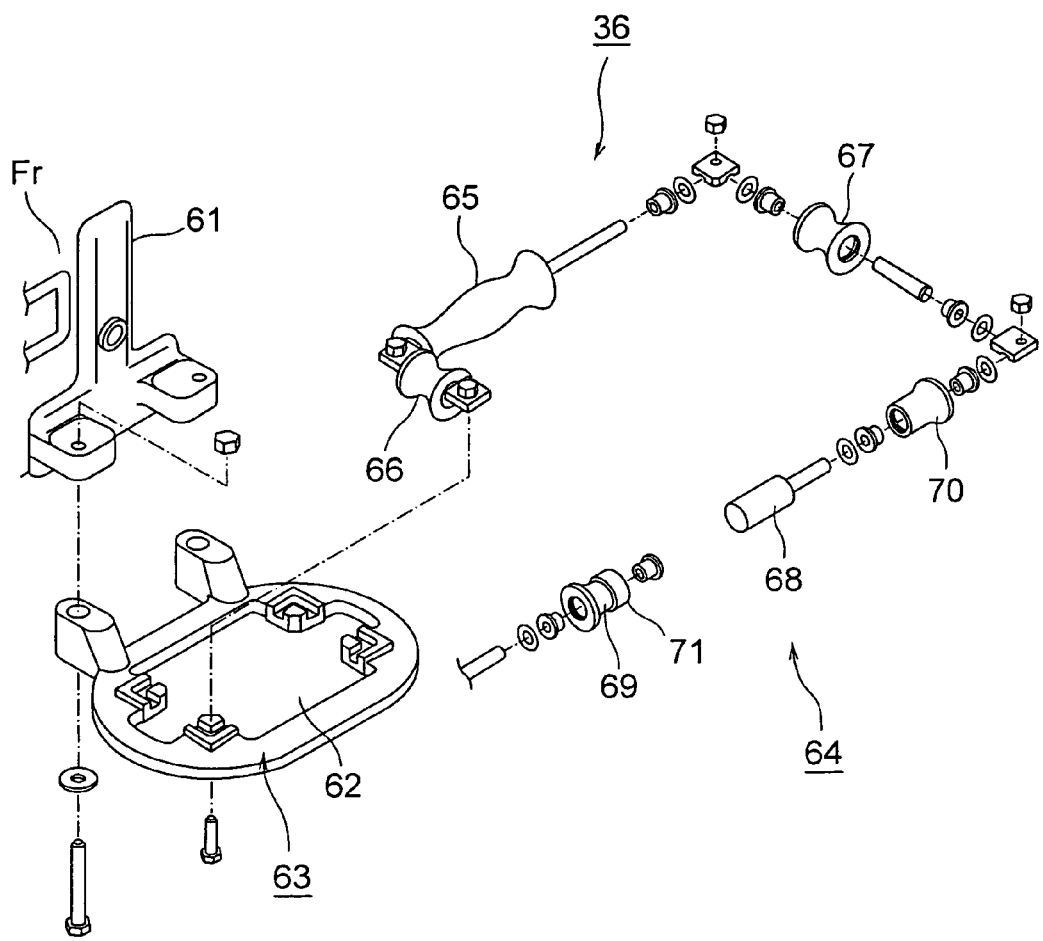
FIG. 6 is an exploded perspective view of the third forming ring in the first embodiment of the present invention.
Figure 7:
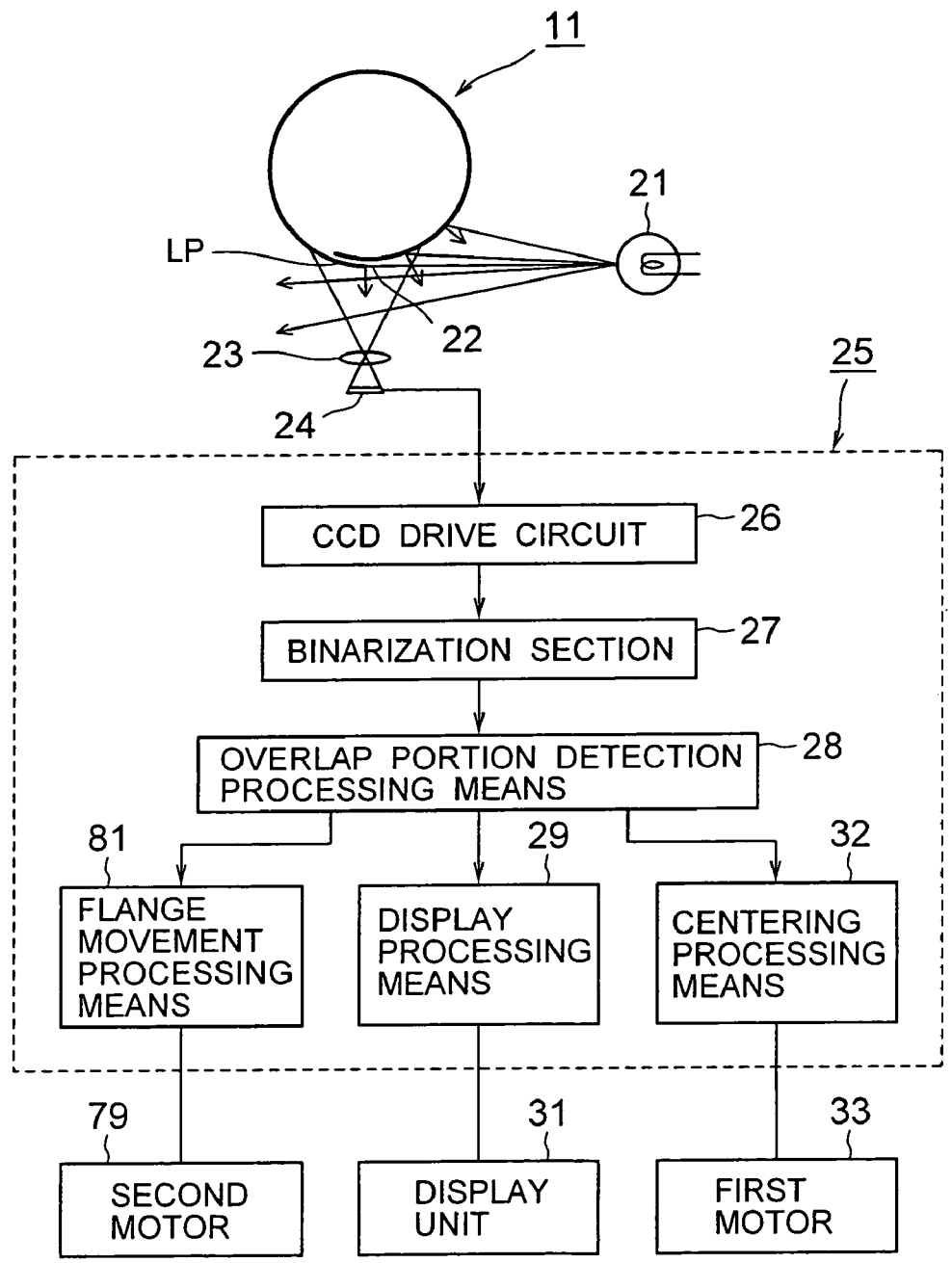
FIG. 7 is a view explaining a control section of the filling apparatus according to the first embodiment of the present invention.

FIG. 4 is a conceptual view of a third forming ring in the first embodiment of the present invention; FIG. 5 is a view showing a main portion of the third forming ring in the first embodiment of the present invention; FIG. 6 is an exploded perspective view of the third forming ring in the first embodiment of the present invention, and FIG. 7 is a view explaining a control section of the filling apparatus according to the first embodiment of the present invention.

In FIGS. 4 to 7, reference numeral 36 denotes the third forming ring. The third forming ring 36 is attached to a bracket 61, which in turn is attached to a frame Fr of the filling apparatus. The third forming ring 36 includes a support plate 63 assuming a substantially elliptical shape and having an opening 62 formed at the center thereof, and first to fourth forming rollers 64-67 disposed in the opening 62 in such a manner that the rollers 64-67 can rotate relative to the support plate 63. The packaging material 11 is deformed within a space enclosed by the first to fourth rollers 64-67.

The first forming roller 64 includes a central, cylindrical member 68; first and second sub-rollers 69 and 70 disposed adjacent to corresponding opposite ends of the cylindrical member 68 and formed such that their diameter increases with increasing distance from the end faces of the cylindrical member 68; and a flange 71 disposed at the boundary portion (contact portion) between the cylindrical member 68 and the first sub-roller 69 in such a manner as to be movable in relation to the first sub-roller 69 in the axial direction of the first forming roller 64 (in the direction of arrow A in FIG. 4). The second forming roller 65 is disposed in parallel with the first forming roller 64 and assumes a substantially spindle-like shape while the diameter is increased in the vicinity of opposite ends thereof. Each of the third and fourth forming rollers 66 and 67 is disposed between the corresponding ends of the first and second forming rollers 64 and 65 and assumes a substantially hourglass-like shape such that the central diameter is relatively small and the diameter in the vicinity of opposite ends thereof is relatively large. Notably, in order to prevent axial movement of the first sub-roller 69 as the flange 71 moves, an annular groove 69a is formed on the circumferential surface of a large-diameter end portion of the first sub-roller 69, and a stopper member Sp is disposed on the frame Fr such that its end is received in the groove 69a.

Next, the operation of a control section 25 of the filling apparatus will be described.

In FIG. 7, reference numeral 11 denotes a tubular packaging material. Since opposite side edges of the packaging material 11 overlap each other at an overlap portion LP, a level difference is formed on the outer circumferential surface of the packaging material 11. Reference numeral 21 denotes a light source. The light source 21 radiates light to a portion of the outer circumferential surface of the packaging material 11 which includes at least the overlap portion LP. For this irradiation, the light source 21 is disposed a predetermined distance away from the overlap portion LP on a tangent which touches the tubular packaging material 11 at the overlap portion LP, and in such a manner as to face an end face 22 of the overlap portion LP. A lens 23 which serves as a light collecting member is disposed at a predetermined position located radially outward from the overlap portion LP on a line passing through the center of the packaging material 11 and the overlap portion LP. The lens 23 gathers light emitted from the light source 21 and reflected from the outer circumferential surface of the packaging material 11.

A CCD 24 is disposed radially outward from the overlap portion LP and the lens 23 on the line passing through the center of the packaging material 11 and the overlap portion LF and on the optical axis of the lens 23. The CCD 24 receives light gathered by the lens 23 and issues a sensor output. The CCD 24 may be a one-dimensional line sensor or a two-dimensional plane sensor. The lens 23 and the CCD 24 constitute image pickup means.

A CCD drive circuit 26 disposed in the control section 25 drives the CCD 24. A sensor output from the CCD 24 is sent to a binarization section 27 via the CCD drive circuit 26 and is binarized at the binarization section 27. In the present embodiment, a comparator can be used as the binarization section 27. The comparator compares the sensor output with a predetermined reference value and outputs 1 or 0. An output from the binarization section 27 is sent to overlap portion detection processing means 28, whereby the overlap portion detection processing means 28 detects the overlap portion LP.

Upon detection of the overlap portion LP, display processing means 29 of the control section 25 performs display processing and issues a detection signal, which is sent to a display unit 31 such as a display. The display unit 31 displays the position of the overlap portion LP. Centering processing means 32 of the control section 25 performs centering processing and causes a first motor 33, which serves as a first drive unit, to run, thereby moving one end of the movable guide roller. For achieving this movement, an unillustrated cam is attached to an unillustrated output shaft of the first motor 33. The cam abuts an unillustrated follower member disposed on the end of the movable guide roller. The cam serves as a first conversion element; the follower member serves as a second conversion element; and a cam mechanism composed of the cam and the follower member serves as a first motion direction conversion section for converting a rotational motion to a linear motion.

When the centering processing means 32 causes the first motor 33 to run to a degree corresponding to a deviation quantity of the overlap portion LP, the end of the movable guide roller is moved accordingly, whereby the positions of opposite side edges of the packaging material 11 vary accordingly. As a result, the overlap portion LP can be moved accordingly for adjustment, thus correcting the deviation of the overlap portion LP.

When the deviation of the overlap portion LP is corrected, the flange 71 can be moved in the direction of arrow A according to the position of the overlap portion LP.

For achieving such movement, a moving mechanism section 72 is disposed. The moving mechanism section 72 includes an operating member 73 disposed in a reciprocatively movable condition, extending through the first sub-roller 69, and linked to the flange 71; a ball screw shaft 74 formed integrally with the operating member 73 and serving as a first conversion element; a ball nut 75 disposed in a rotational relation with the frame Fr, screw-engaged with the ball screw shaft 74, and serving as a second conversion element; a gear 76 attached to the ball nut 75 and serving as a follower member; a gear 77 meshed with the gear 76 and serving as a drive member; and a second motor 79 connected to the gear 77 via an output shaft 78 and serving as a second drive unit. Notably, the ball screw shaft 74 and the ball nut 75 constitute a ball screw serving as a second motion direction conversion section for converting a rotational motion to a linear motion. The gear 76 and the gear 77 constitute a rotation transmission mechanism section.

When the overlap portion detection processing means 28 detects the overlap portion LP, flange movement processing means 81 of the control section 25 calculates the position of the overlap portion LP. On the basis of the result of the calculation, the flange movement processing means 81 causes the second motor 79 to run. The running second motor 79 causes the ball nut 75 to rotate, whereby the ball screw shaft 74 is moved in the direction of arrow B to thereby move the flange 71 in the direction of arrow A. Notably, the moving distance of the flange 71 is about ±1 [mm]. An unillustrated position sensor, which serves as a position detecting section, may be disposed adjacent to the flange 71, as needed. The position sensor detects the position of the flange 71 and feeds the detected position back to the control section 25. The aforementioned moving mechanism section may be composed of a pneumatic cylinder, an operating member which is reciprocatively moved by the pneumatic cylinder, and other members.

Thus, even when, within the third forming ring 36, a side edge portion of the packaging material 11 of a certain size impinges on the flange 71, the flange 71 is moved relative to the first sub-roller 69 in the direction of arrow A according to the position of the overlap portion LP. Therefore, the flange 71 does not interfere with correction oh the position of the overlap portion LP, whereby the position of the overlap portion LP can be reliably corrected.

As shown in FIG. 4, an inner seal 82 is affixed to one side edge portion of the packaging material 11 in order to seal the tubular packaging material 11 from the inside of the packaging material 11 when the packaging material 11 is longitudinally sealed.

Next, a second embodiment of the present invention will be described. Structural features similar to those of the first embodiment are denoted by common reference numerals, and repeated description thereof is omitted.

Figure 8:
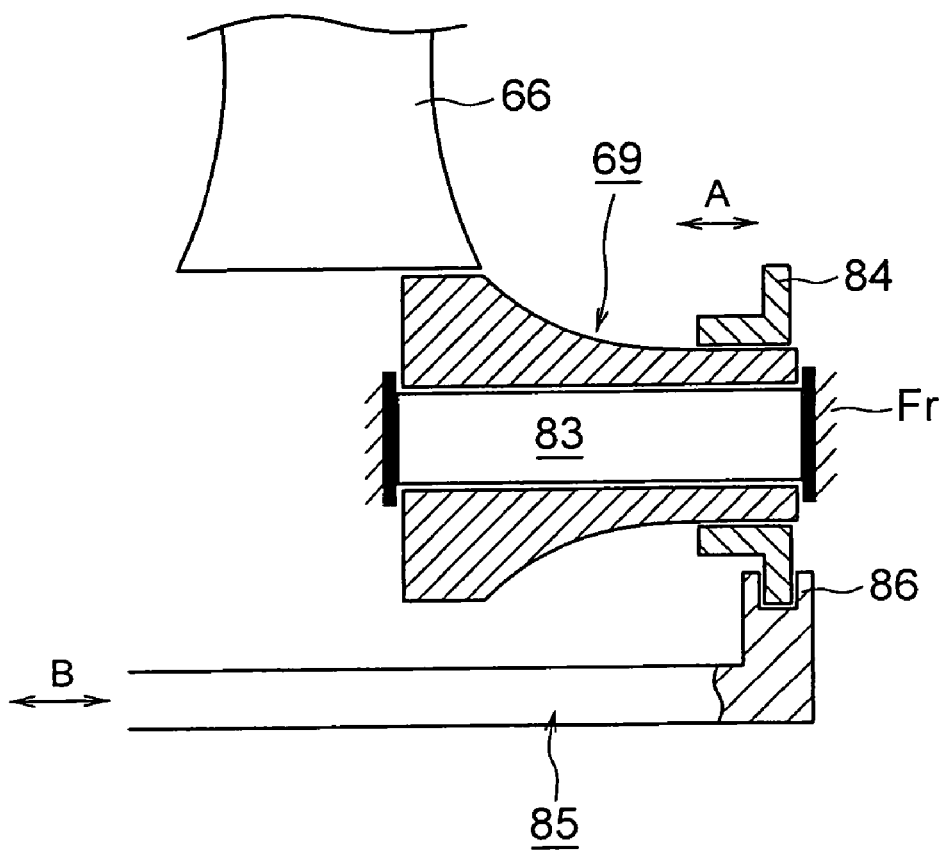
FIG. 8 is a view showing a main portion of a third forming ring in a second embodiment of the present invention.

FIG. 8 is a view showing a main portion of a third forming ring in the second embodiment of the present invention.

In this case, the first sub-roller 69 is rotatably supported by a shaft 83 fixedly attached to the frame Fr. A flange 84 is disposed at the boundary portion (contact portion) between the cylindrical member 68 (FIG. 6) and the first sub-roller 69 in such a manner as to be movable in relation to the first sub-roller 69 in the axial direction of the first forming roller 64 (in the direction of arrow A in FIG. 8).

A moving mechanism section for moving the flange 84 includes an operating member 85 disposed in a reciprocatively movable condition (in a condition movable in the direction of arrow B). The operating member 85 is linked to the flange 84 at the outer circumference of the first sub-roller 69. For this linkage, an outer circumferential edge of the flange 84 is slidably fitted into a groove 86 formed at an end of the operating member 85.

Next will be described a third embodiment of the present invention in which a lateral sealing device performs ultrasonic sealing.

Figure 9:
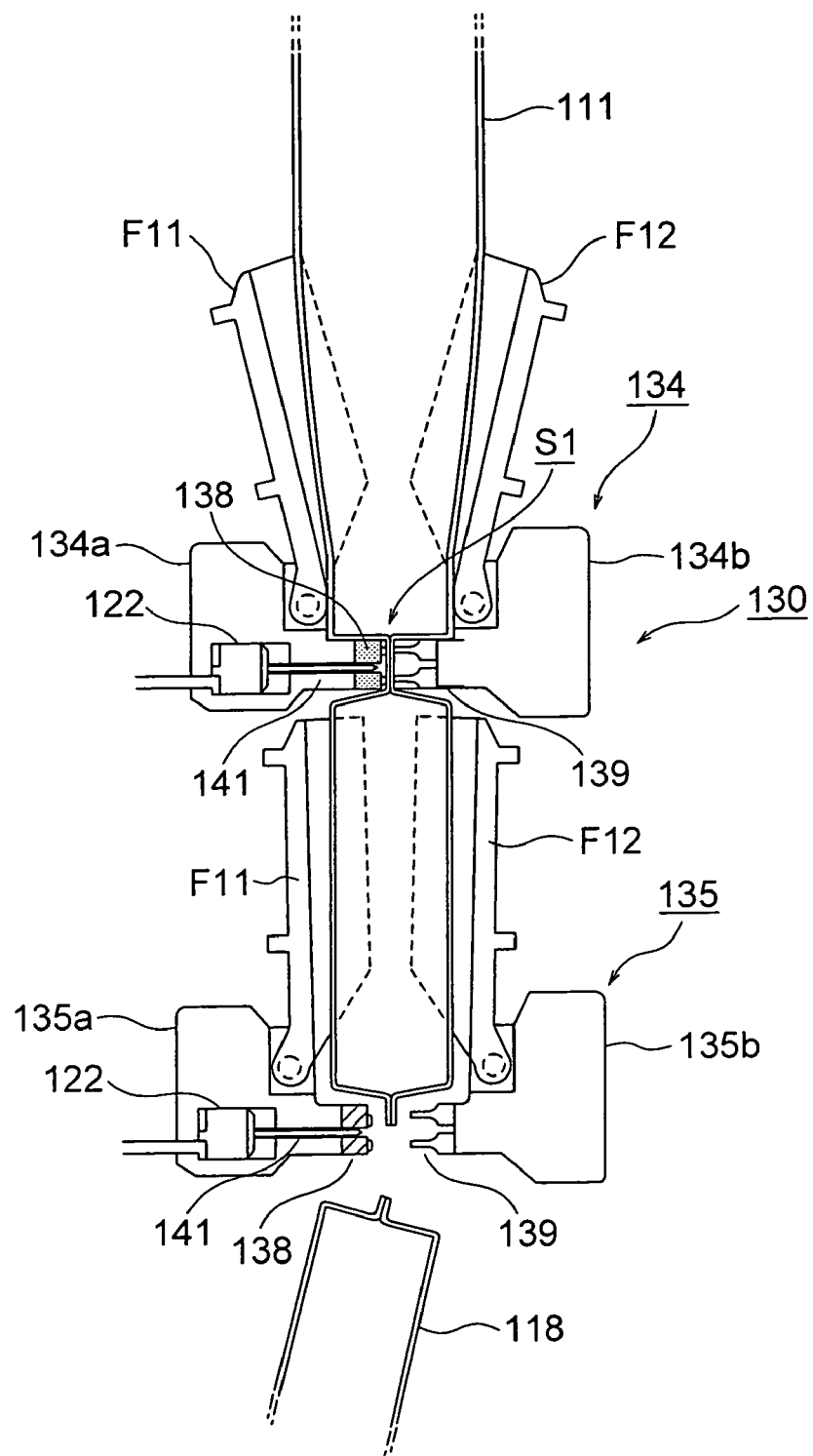
FIG. 9 is a view showing a lateral sealing device in a third embodiment of the present invention.
Figure 10:
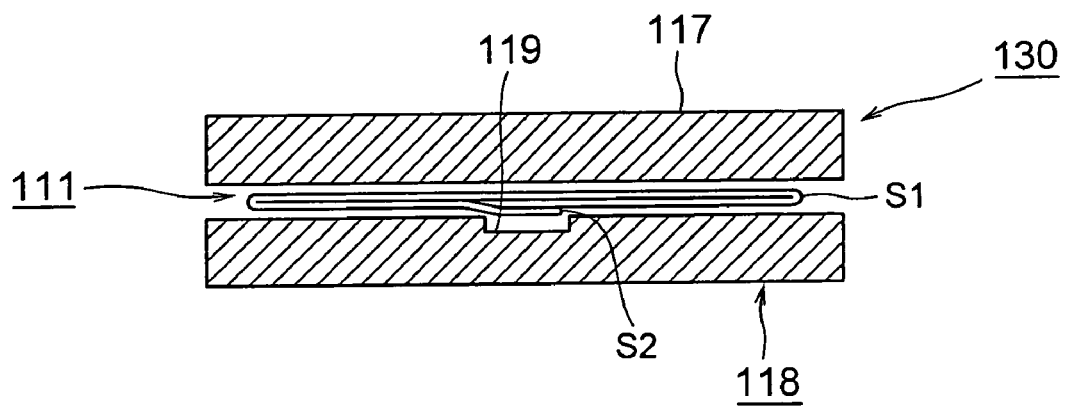
FIG. 10 is a sectional view showing a main portion of the lateral sealing device in the third embodiment of the present invention.

FIG. 9 is a view showing a lateral sealing device in the third embodiment of the present invention, and FIG. 10 is a sectional view showing a main portion of the lateral sealing device in the third embodiment of the present invention.

In FIGS. 9 and 10, reference numeral 130 denotes a lateral sealing device. In order to enhance processing speed, the lateral sealing device 130 includes two sealing-cutting units 134 and 135 of the same structure. The sealing-cutting units 134 and 135 are alternatingly operated such that their operating cycles are shifted from each other by half cycle, and are moved reciprocatively and vertically by means of an unillustrated operating mechanism section.

The sealing-cutting units 134 and 135 include counter jaws 134a and 135a and seal jaws 134b and 135b, respectively. A counter bar 138 is disposed at an end of each of the counter jaws 134a and 135a, and a seal block 39 is disposed at an end of each of the seal jaws 134b and 135b. The lateral sealing device 130 utilizes ultrasonic waves for sealing. Specifically, the counter bar 138 includes two anvils 118, and the seal block 139 includes two horns 117. The operating mechanism section, when activated, causes the counter jaws 134a and 135a and the seal jaws 134b and 135b to advance, whereby the anvils 118 and the horns 117 grip a packaging material 111 from opposite sides. As a result, the facing surfaces of the packaging material 111 are brought in contact with each other and undergo lateral sealing to thereby form two seal lines at a lateral seal portion S1.

A laterally extending flat cutter knife 141 is provided at the center of each of the counter jaws 134a and 135a in a reciprocatively movable condition (in a condition movable rightward and leftward in FIG. 9). When the cutter knife 141 is advanced (moved rightward in FIG. 9), the cutter knife 141 cuts the lateral seal portion S1 at an intermediate position between the two seal lines. A cylinder 122 is disposed at the rear end of the cutter knife 141 so as to advance and retreat the cutter knife 141 through supply of compressed air or the like to and release the same from the cylinder 122. Notably, reference numerals F11 and F12 denote forming flaps. The forming flaps F11 and F12 are pivotably attached to the counter jaws 134a and 135a and the seal jaws 134b and 135b, respectively, in such a manner as to surround and guide the tubular packaging material 111, and are adapted to form the tubular packaging material 111 into a brick-like shape.

In FIG. 9, the sealing-cutting unit 134 is at the sealing-cutting start position. At the sealing-cutting start position, the sealing-cutting unit 134 causes the counter jaw 134a and seal jaw 134b to advance so as to grip the packaging material 111 from opposite sides, whereby the facing surfaces of the packaging material 111 are brought in contact with each other.

Then, the operating mechanism section causes the sealing-cutting unit 134 to move downward while the same is gripping the packaging material 111. During the downward movement, the lateral seal portion S1 is formed, thereby forming a prototype container 118.

In FIG. 9, the sealing-cutting unit 135 is at the sealing-cutting end position. Immediately before the sealing-cutting unit 135 reaches the sealing-cutting end position, the cutter knife 141 is caused to advance and cut the lateral seal portion S1 at an intermediate position between the two seal lines, thereby separating the prototype container 118.

When the lateral seal portion S1 is cut at an intermediate position between the two seal lines, the operating mechanism section causes the counter jaw 135a and the seal jaw 135b of the sealing-cutting unit 135 to retreat and then move upward in a gyrating manner to the sealing-cutting start position. When the sealing-cutting unit 135 is moved to the sealing-cutting start position, the sealing-cutting unit 134 is moved to the sealing-cutting end position, and the operating mechanism section causes the counter jaw 135a and the seal jaw 135b to advance. At this timing, the cutter knife 141 of the sealing-cutting unit 134 is caused to advance and perform cutting at an intermediate position between the seal lines, thereby separating the prototype container 118.

Notably, each of the sealing-cutting units 134 and 135 has an unillustrated cylinder mechanism. Supply of compressed air or the like to the cylinder mechanism draws the counter jaws 134a and 135a and the seal jaws 134b and 135b to each other, thereby increasing a pressing force involved in sealing.

Application of a pressing force effected by the counter jaws 134a and 135a and the seal jaws 134b and 135b, respectively, is cancelled in a short period of time, and the sealing-cutting unit 134 or 135 reaches the sealing-cutting end position.

The tubular packaging material 111 has an overlap portion (longitudinal seal portion) S2 formed continuously as shown in FIG. 10 as a result of longitudinal sealing. When the quantity of paper overlap indicative of the quantity of overlap of side edges of the packaging material 111; i.e., an overlap quantity, varies, not only is the appearance of a packaging container impaired, but also seal defect arises in the lateral seal portion S1.

Particularly, in the lateral sealing device 130 in the present embodiment which employs ultrasonic sealing, variations in overlap quantity are more likely to raise occurrence of seal defect at the lateral seal portion S1. Specifically, the lateral sealing device 130 is configured such that each horn 117 for generating ultrasonic waves and each anvil 118 face each other and grip the packaging material 111 therebetween. Since the packaging material 111 has the overlap portion S2 formed continuously in the longitudinal direction, the packaging material 111 is gripped in the lateral sealing device 130 such that a portion corresponding to the overlap portion S2 has a thickness greater than that of the other portion as shown in FIG. 10. Thus, if ultrasonic waves generated at the horn 117 are only transmitted to a portion corresponding to the overlap portion S2 and fail to be transmitted to the entire lateral seal portion S1, ultrasonic sealing cannot be reliably performed. In order to cope with the problem, a recess 119 for receiving the overlap portion S2 is formed on the anvil 118 so as to uniformly transmit ultrasonic waves to the entire lateral seal portion S1 when the packaging material 111 is gripped between the horn 117 and the anvil 118.

However, when the aforementioned overlap quantity varies, particularly, when the overlap quantity increases, the overlap portion S2 becomes too large to be received in the recess 119 and projects from the recess 119. As a result, ultrasonic waves are not transmitted to the entire lateral seal portion S1, and sealing cannot be reliably performed, resulting in occurrence of seal defect.

Thus, the filling apparatus is designed to automatically detect an overlap quantity.

Figure 11:
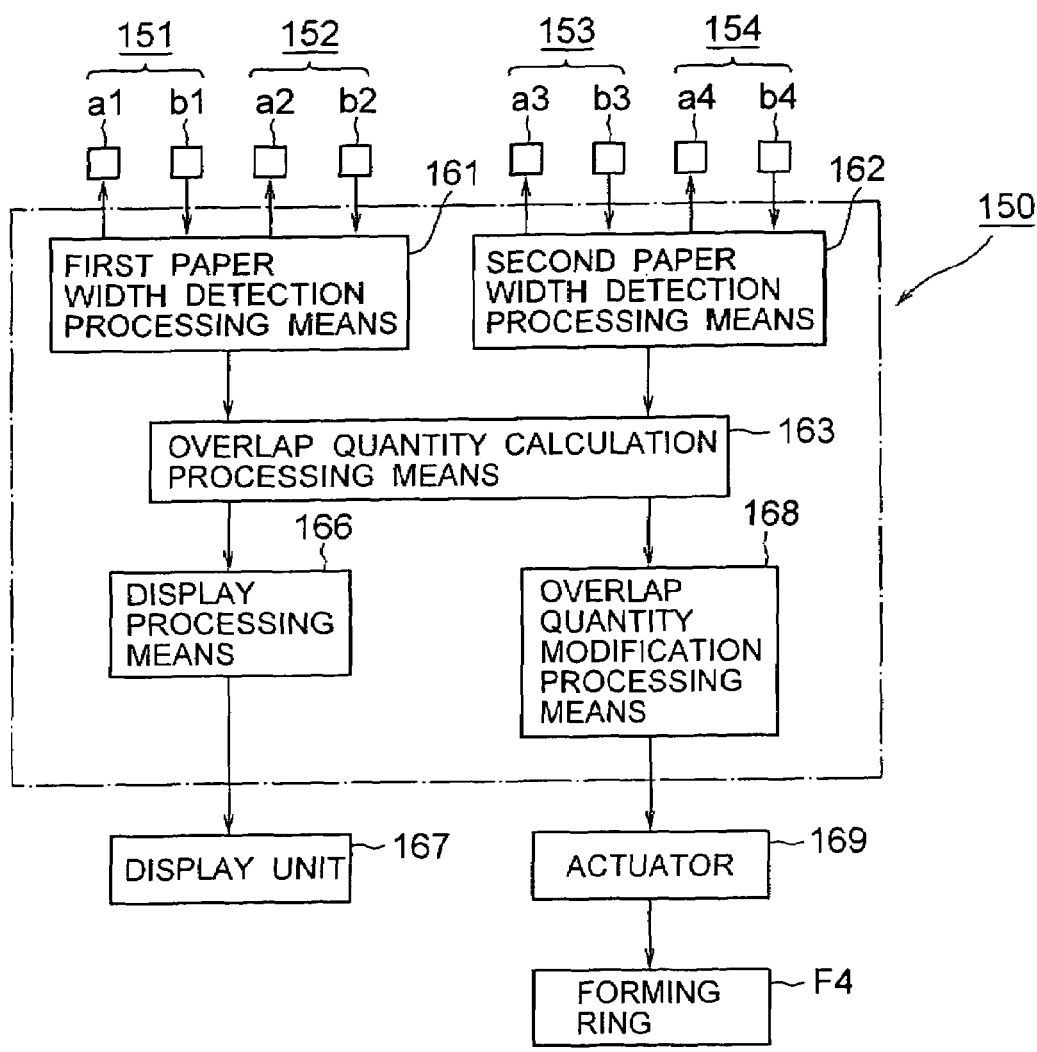
FIG. 11 is a control block diagram of the filling apparatus in the third embodiment of the present invention.
Figure 12:
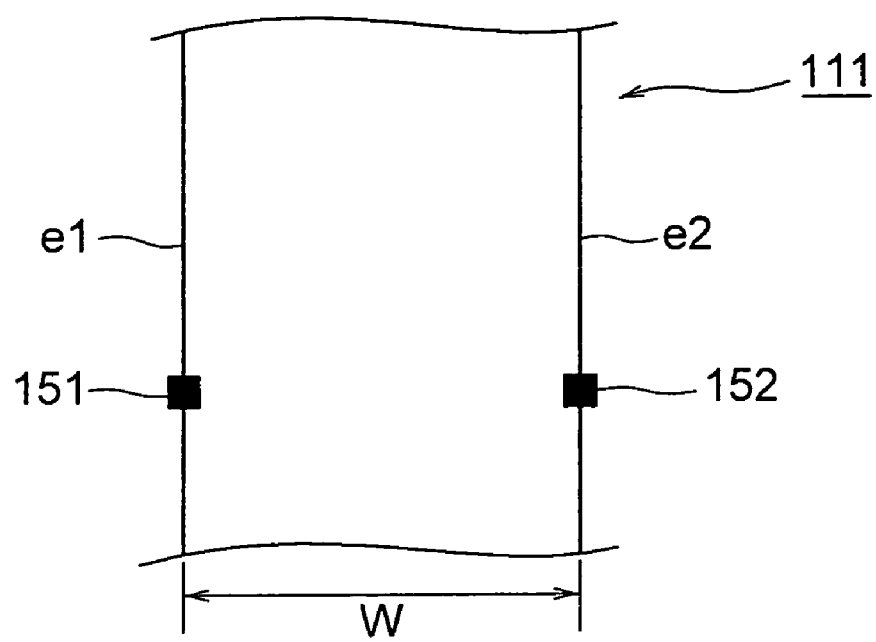
FIG. 12 is a conceptual view of a first paper width detection section in the third embodiment of the present invention.
Figure 13:
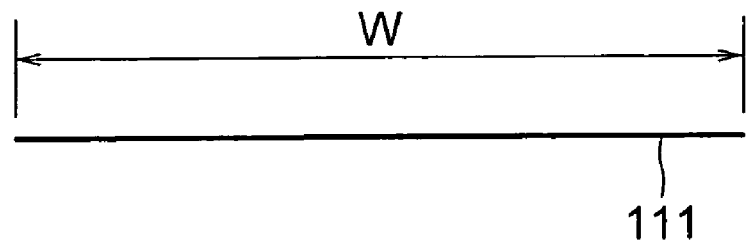
FIG. 13 is an explanatory view of a first paper width in the third embodiment of the present invention.
Figure 14:
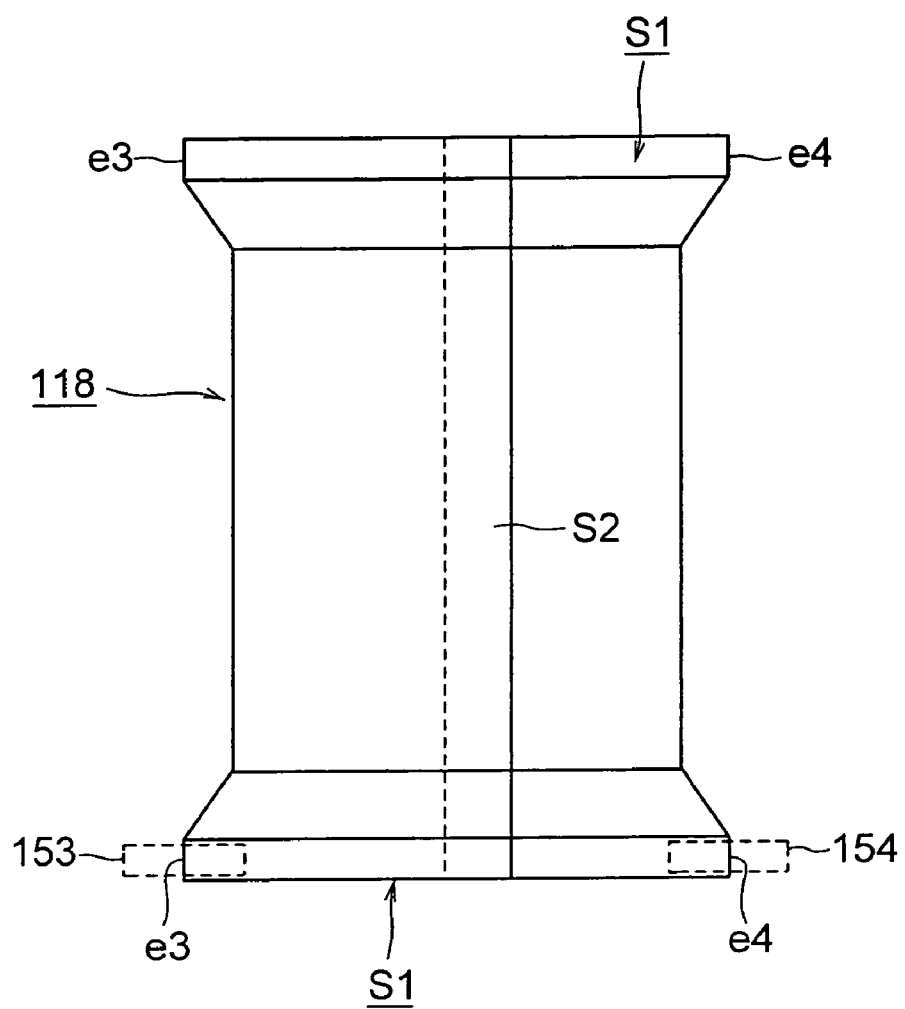
FIG. 14 is a conceptual view of a second paper width detection section in the third embodiment of the present invention.
Figure 15:
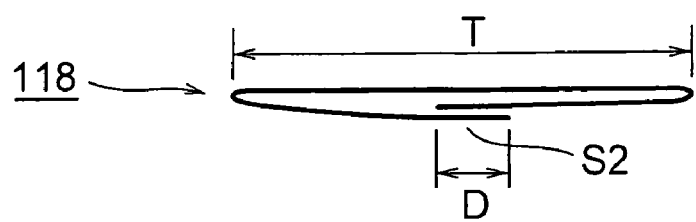
FIG. 15 is an explanatory view of a second paper width in the third embodiment of the present invention.

FIG. 11 is a control block diagram of the filling apparatus in the third embodiment of the present invention; FIG. 12 is a conceptual view of a first paper width detection section in the third embodiment of the present invention; FIG. 13 is an explanatory view of a first paper width in the third embodiment of the present invention; FIG. 14 is a conceptual view of a second paper width detection section in the third embodiment of the present invention; and FIG. 15 is an explanatory view of a second paper width in the third embodiment of the present invention.

In FIGS. 12 and 13, reference numeral 111 denotes a web-like packaging material; reference numeral 151 denotes a laser sensor which serves as a first edge detecting section for detecting one side edge e1 of the packaging material 111; and reference numeral 152 denotes a laser sensor which serves as a second edge detecting section for detecting the other side edge e2 of the packaging material 111.

Figure 1:
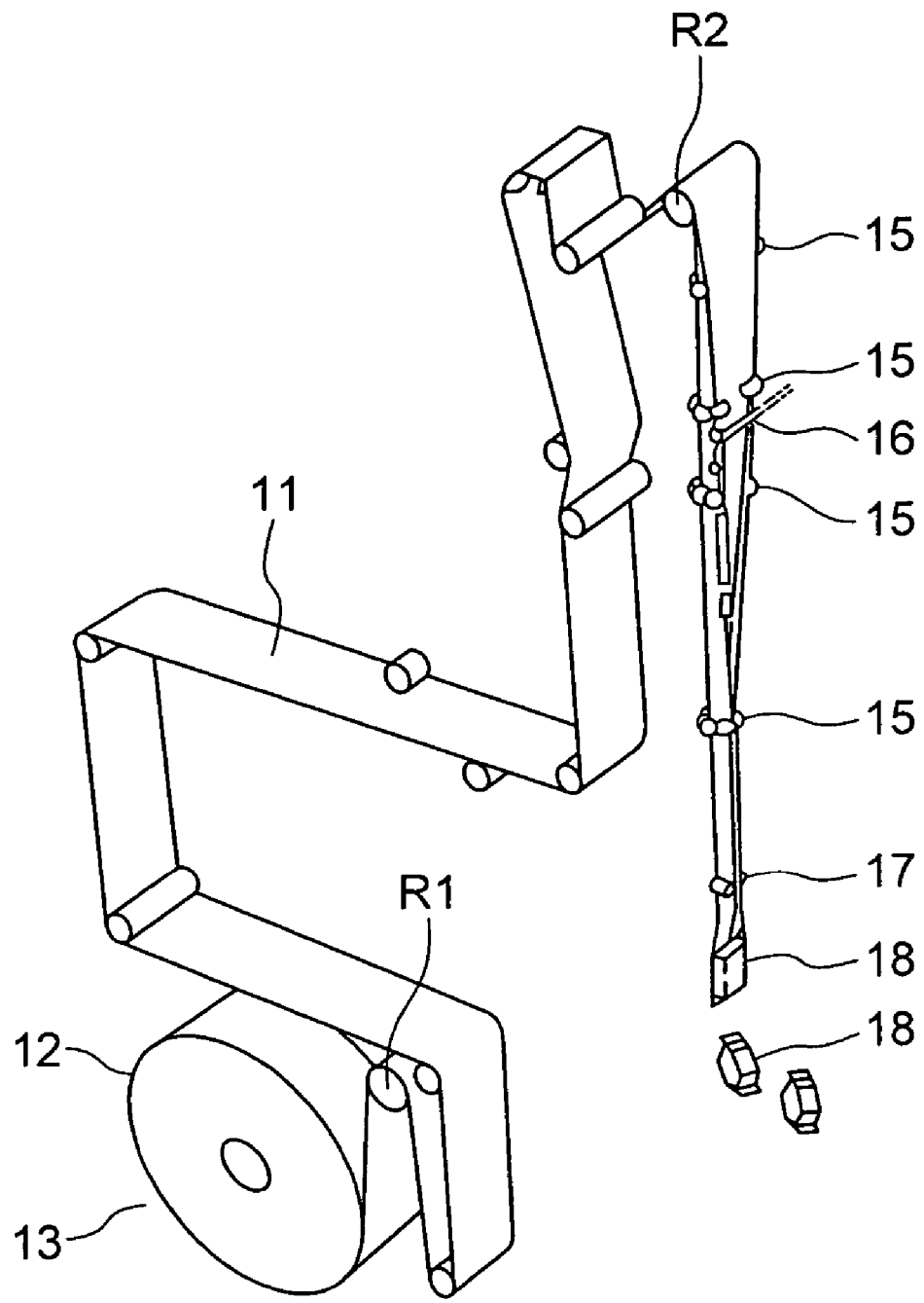
FIG. 1 is a schematic view of a conventional filling apparatus.

The laser sensors 151 and 152 are disposed in parallel with each other at a predetermined position located between the guide roller R1 (FIG. 1) and the guide roller R2 in the travel path of the packaging material 111. The laser sensors 151 and 152 include laser generating sections a1 and a2 and detectors b1 and b2, respectively. The laser generating sections a1 and a2 are disposed on the front side of the packaging material 111 and are adapted to radiate a laser beam which serves as a detection beam. The detectors b1 and b2 are disposed on the back side of the packaging material 111 in such a manner as to face the laser generating sections a1 and a2, respectively, and are adapted to receive the corresponding laser beams.

In this case, each of the laser beams generated in the laser generating sections a1 and a2 assumes the form of a parallel pencil of rays. When the packaging material 111 blocks off a predetermined portion of the parallel pencil of rays along the width direction of the parallel pencil of rays, the portion of the parallel pencil of rays fails to reach the detectors b1 and b2. As a result, a sensor output from each of the detectors b1 and b2 involves a high level portion and a low level portion. First paper width detection processing means 161 of a control section 150 performs first paper width detection processing. Specifically, the first paper width detection processing means 161 activates the laser generating sections a1 and a2 so as to generate the respective laser beams, and receives sensor outputs from the detectors b1 and b2. The first paper width detection processing means 161 calculates the boundary between a high level portion and a low level portion of each of the received sensor outputs, thereby detecting the opposite side edges e1 and e2. Subsequently, on the basis of the detected opposite side edges e1 and e2, the first paper width detection processing means 161 calculates width W, which serves as a first paper width, of the web-like packaging material 111.

In FIGS. 14 and 15, reference numeral 118 denotes a prototype container assuming a pillow-like shape, a bag-like shape, or a like shape; reference numeral S2 denotes an overlap portion; reference numeral 153 denotes a laser sensor which serves as a third edge detecting section for detecting one side edge e3 of the lateral seal portion S1 of the packaging material 111; and reference numeral 154 denotes a laser sensor which serves as a fourth edge detecting section for detecting the other side edge e4 of the lateral seal portion S1 of the packaging material 111.

The laser sensors 153 and 154 are disposed slightly below the sealing-cutting end position of the sealing-cutting units 134 and 135. Thus, the opposite side edges e3 and e4 are detected immediately after the prototype container 118 is separated as a result of the lateral seal portion S1 being cut at an intermediate position between seal lines. When the lateral seal portion S1 is cut at an intermediate portion between two seal lines, the aforementioned operating mechanism section causes the counter jaws 134a and 135a and the seal jaws 134b and 135b to retreat; thus, at a position located slightly below the sealing-cutting end position, the counter jaws 134a and 135a and the seal jaws 134b and 135b do not shield the opposite side edges e3 and e4 from view from the laser sensors 153 and 154.

Also, the opposite side edges e3 and e4 of the separated prototype container 118 can be detected as needed. In this case, an unillustrated guide member is disposed for positioning the prototype container 118. Furthermore, respective laser sensors can be disposed on the counter jaws 134a and 135a and the seal jaws 134b and 135b.

The laser sensors 153 and 154 include laser generating sections a3 and a4 and detectors b3 and b4, respectively. The laser generating sections a3 and a4 are disposed on the front side of the prototype container 118 and are adapted to radiate a laser beam which serves as a detection beam. The detectors b3 and b4 are disposed on the back side of the prototype container 118 in such a manner as to face the laser generating sections a3 and a4, respectively, and are adapted to receive the corresponding laser beams.

In this case, each of the laser beams generated in the laser generating sections a3 and a4 assumes the form of a parallel pencil of rays. When the prototype container 118 blocks off a predetermined portion of the parallel pencil of rays along the width direction of the parallel pencil of rays, the portion of the parallel pencil of rays fails to reach the detectors b3 and b4. As a result, a sensor output from each of the detectors b3 and b4 involves a high level portion and a low level portion. Second paper width detection processing means 162 of the control section 150 performs second paper width detection processing. Specifically, the second paper width detection processing means 162 activates the laser generating sections a3 and a4 so as to generate the respective laser beams, and receives sensor outputs from the detectors b3 and b4. The second paper width detection processing means 162 calculates the boundary between a high level portion and a low level portion of each of the received sensor outputs, thereby detecting the opposite side edges e3 and e4. Subsequently, on the basis of the detected opposite side edges e3 and e4, the second paper width detection processing means 162 calculates width T, which serves as a second paper width, of the lateral seal portion S1.

Overlap quantity calculation processing means 163 of the control section 150 performs overlap quantity calculation processing in which overlap quantity D is calculated, as expressed below, on the basis of the width W detected by the first paper width detection processing means 161 and the width T detected by the second paper width detection processing means 162.

$$D = W - 2 \times T$$

In the present embodiment, the two laser sensors 151 and 152 are used to detect the opposite side edges e1 and e2, and the two laser sensors 153 and 154 are used to detect the opposite side edges e3 and e4. However, the opposite side edges e1 and e2 of the packaging material 111 and the opposite side edges e3 and e4 of the lateral seal portion S1 can be detected by means of respective single laser sensors. Also, in place of the laser sensors 151-154, other optical sensors or a CCD camera can be used to detect the opposite side edges e1 and e2 of the packaging material 111 and the opposite side edges e3 and e4 of the lateral seal portion S1. Notably, when a CCD camera is used, unillustrated image processing means of the control section 150 performs image processing, as needed, and detects the opposite side edges e1 and e2 of the packaging material 111 and the opposite side edges e3 and e4 of the lateral seal portion S1 on the basis of image data obtained through the CCD camera.

When the overlap quantity D is calculated, display processing means 166 of the control section 150 performs display processing, generates a detection signal, and sends the detection signal to a display unit 167 such as a display so as to display the overlap quantity D on the display unit 167. Overlap quantity modification processing means 168 of the control section 150 performs overlap quantity modification processing. Specifically, the overlap quantity modification processing means 168 compares a calculated overlap quantity and a set value and causes, on the basis of the result of the comparison, the actuator 169 to operate so as to modify the overlap quantity through movement of a forming ring F4 (or a portion of the same). In this case, the forming ring F4 serves as the overlap quantity modification section.

As described above, the overlap quantity D can be automatically calculated on the basis of the opposite side edges e1 and e2 detected by means of the laser sensors 151 and 152 and the opposite side edges e3 and e4 detected by means of the laser sensors 153 and 154, thereby not only simplifying an operator's work but also avoiding generation of variation in judgment of whether or not an overlap quantity D is appropriate, which variation would otherwise be generated due to detection error, variations among operators, etc.

As a result, variations in quality among packaging containers do not arise.

Next, a fourth embodiment of the present invention will be described.

Figure 16:
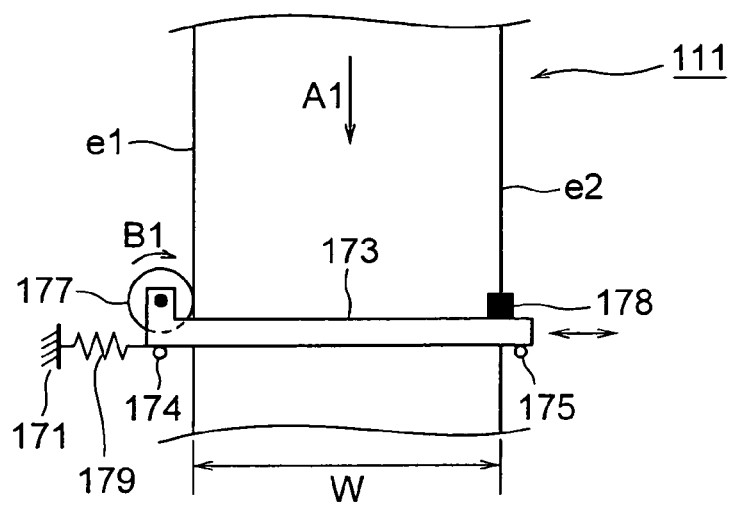
FIG. 16 is a conceptual view of a first paper width detection section in a fourth embodiment of the present invention.

FIG. 16 is a conceptual view of a first paper width detection section in the fourth embodiment of the present invention.

In FIG. 16, reference numeral 111 denotes a web-like packaging material; reference numeral 171 denotes a frame of the filling apparatus; reference numeral 173 denotes a detection bar, which is disposed at a predetermined position located on the travel path of the packaging material 111 between the guide roller R1 (FIG. 1) and the guide roller R2 in such a manner as to extend across the packaging material 111 and to be movable along the width direction (lateral direction) of the packaging material 111. A roller 177, which is a rotary body and serves as the first edge detecting section, is rotatably attached to one end of the detection bar 173; a laser sensor 178, which serves as the second edge detecting section, is attached to the other end of the detection bar 173; and a spring 179, which serves as an impelling member, is disposed between the frame 171 and the detection bar 173 in such a manner as to impel the roller 177 toward the packaging material 111 so as to press the roller 177 against one side edge e1 of the packaging material 111. Thus, as the packaging material 111 travels in the direction of arrow A1, the roller 177 follows the travel and rotates in the direction of arrow B1.

The laser sensor 178 detects the other side edge e2 of the packaging material 111.

The laser sensor 178 includes a laser generating section and a detector. The laser generating section is disposed on the front side of the packaging material 111 and is adapted to radiate a laser beam which serves as a detection beam. The detector is disposed on the back side of the packaging material 111 in such a manner as to face the laser generating section, and are adapted to receive the laser beam.

In this case, since the spring 179 impels the roller 177 to be pressed against one side edge e1 of the packaging material 111, meandering of the packaging material 111, if any, can be detected through detection of the side edge e1 by means of the roller 177. When the roller 177 is moved according to meandering of the packaging material 111, the laser sensor 178 is also moved accordingly, whereby the other side edge e2 can be detected.

Therefore, even when the packaging material 111 meanders, the opposite side edges e1 and e2 of the packaging material 111 can be stably detected, and thus the overlap quantity D can be stably detected.

Next, a fifth embodiment of the present invention will be described.

Figure 17:
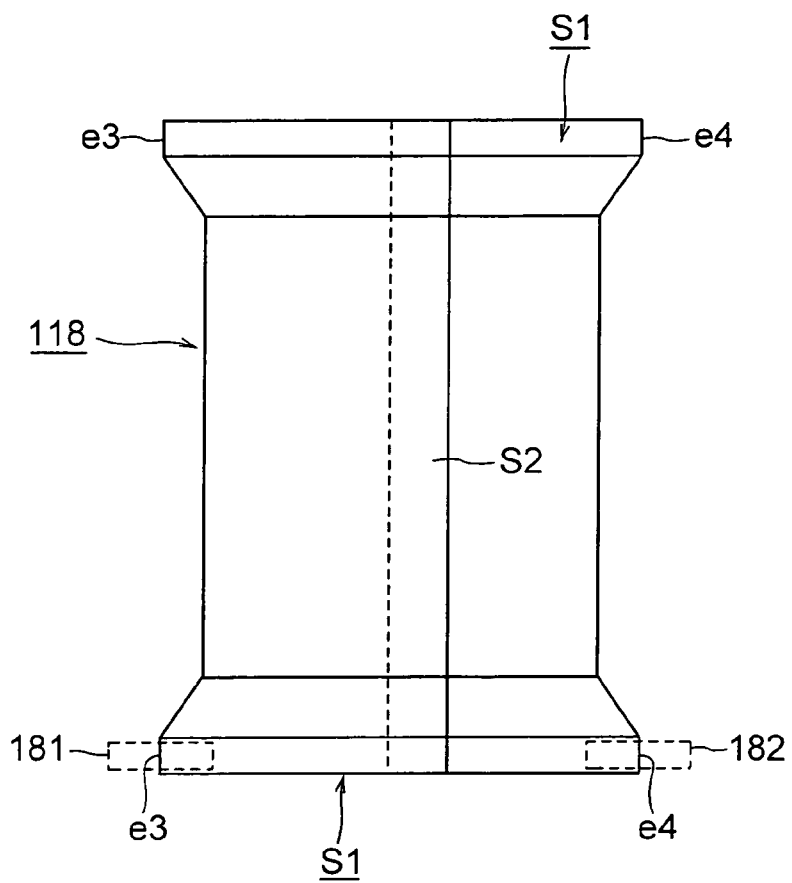
FIG. 17 is a conceptual view of a second paper width detection section in a fifth embodiment of the present invention.

FIG. 17 is a conceptual view of a second paper width detection section in the fifth embodiment of the present invention.

In FIG. 17, reference numeral 118 denotes a prototype container assuming a pillow-like shape, a bag-like shape, or a like shape; reference numeral 181 denotes an edge detection window which serves as a third edge detecting section for detecting one side edge e3 of the lateral seal portion S1; and reference numeral 182 denotes an edge detection window which serves as a fourth edge detecting section for detecting the other side edge e4 of the lateral seal portion S1. In this case, an unillustrated position sensor which serves as a predetermined position detecting section is disposed in each of the edge detection windows 181 and 182. The position sensors detect the positions of the opposite side edges e3 and e4 as observed through the edge detection windows 181 and 182.

The edge detection windows 181 and 182 are disposed slightly below the sealing-cutting end position of the sealing-cutting units 134 and 135. Thus, the positions of the opposite side edges e3 and e4 are detected as T1 and T2 immediately after the prototype container 118 is separated as a result of the lateral seal portion S1 being cut at an intermediate position between seal lines.

Unillustrated second paper width detection processing means of the control section 150 performs second paper width detection processing in which width T of the lateral seal portion S1 is obtained through calculation on the basis of the positions T1 and T2.

As a result, unillustrated overlap quantity calculation processing means of the control section 150 performs overlap quantity calculation processing in which the overlap quantity D is obtained through calculation on the basis of the widths W and T.

Meanwhile, upon variation in overlap quantity D, in order to adjust the overlap quantity D, the forming ring 15 (see FIG. 1) is conceivably replaced with that of different size. For example, when the overlap quantity D is too large, the forming ring 15 is replaced with that of smaller size so as to weaken squeeze of the packaging material 11, thereby reducing the overlap quantity D accordingly. When the overlap quantity D is too small, the forming ring 15 is replaced with that of larger size so as to increase squeeze of the packaging material 11, thereby increasing the overlap quantity D accordingly.

However, in this case, since the forming ring 15 must be replaced with that of different size in order to adjust the overlap quantity D, troublesome work is involved. Also, in order to replace the forming rings 15, the operation of the filling apparatus must be stopped. In this case, when the filling apparatus is to resume operation after replacement of the forming rings 15, predetermined set values must be modified. Thus, not only does preparatory time before the filling apparatus resumes operation increase, but also preparatory work for resuming operating the filling apparatus becomes troublesome. Furthermore, in some cases, since whether or not newly set values yield expected effects is unknown before the filling apparatus resumes operation, the newly set values may need to be modified again, thereby rendering work more troublesome.

In the case of an aseptic-type filling apparatus for producing aseptic packaging containers, replacement of the forming rings 15 involves loss of sterility.

In view of the foregoing, a sixth embodiment of the present invention is designed to simplify adjustment of overlap quantity D. The sixth embodiment will next be described.

Figure 18:
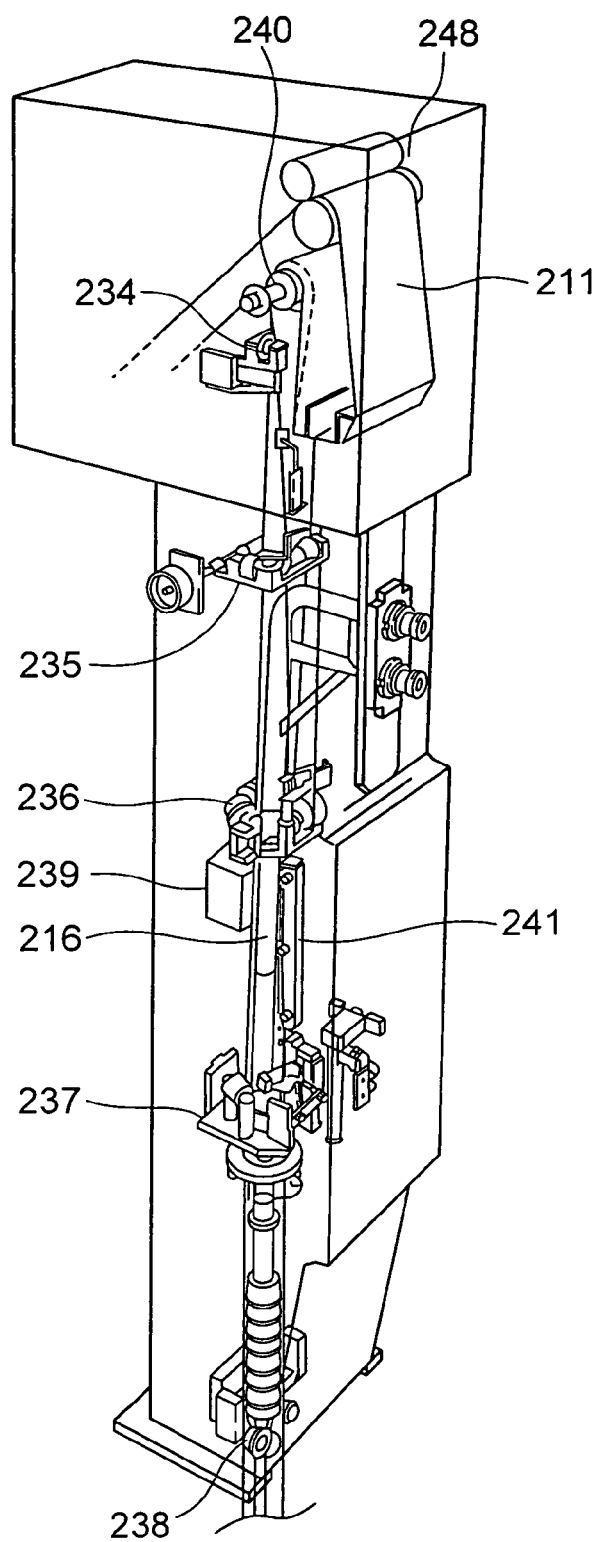
FIG. 18 is a perspective view showing a main portion of a filling apparatus according to a sixth embodiment of the present invention.
Figure 19:
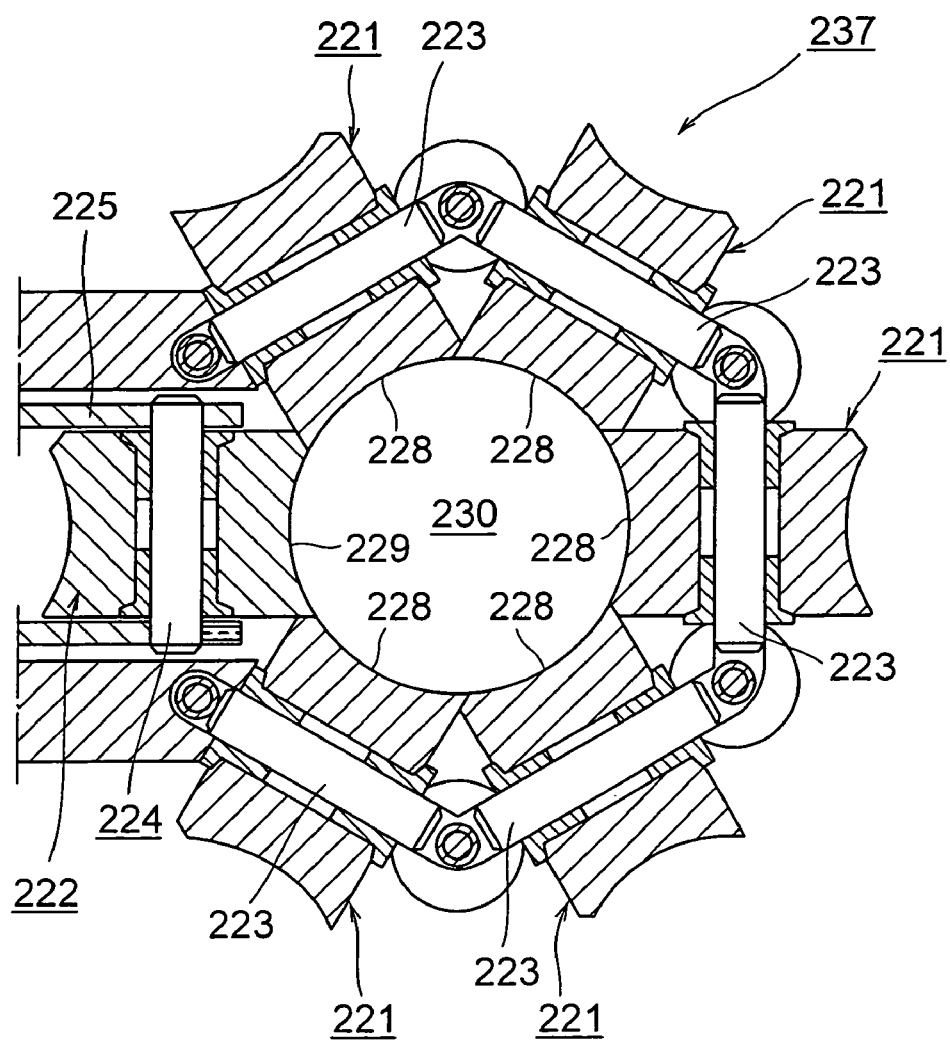
FIG. 19 is a view showing a state of disposition of a forming ring in the sixth embodiment of the present invention.

FIG. 18 is a perspective view showing a main portion of a filling apparatus according to the sixth embodiment of the present invention, and FIG. 19 is a view showing a state of disposition of a forming ring in the sixth embodiment of the present invention.

In FIGS. 18 and 19, reference numeral 211 denotes a web-like packaging material formed from a flexible laminated material. The laminated material includes a paper substrate, a resin layer overlying one surface of the paper substrate, an aluminum foil layer overlying the other surface of the paper substrate, and a resin layer overlying the aluminum foil layer. The packaging material 211 is produced by an unillustrated packaging-material production machine; set, in the form of a reel, on an unillustrated delivery unit; delivered by means of the delivery unit; and caused to travel through the filling apparatus by means of a feed apparatus.

While the packaging material 211 is traveling through the filling apparatus, an unillustrated hole is punched in the packaging material 211, and an unillustrated inner tape and an unillustrated pull tab are affixed to the packaging material 211 in such a manner as to cover the punched hole. Subsequently, as illustrated, the packaging material 211 is caused to travel vertically. The vertically traveling packaging material 211 is guided and deformed into a tubular shape by means of first to fifth forming rings 240 and 234-237 disposed at a plurality of positions along the traveling direction. While being guided by means of a tube guide roller 238 disposed downstream of the fourth forming ring 237, the tubular packaging material 211 is sealed at opposite side edges in the longitudinal direction by means of a longitudinal sealing device 241, and liquid food is supplied from above to the packaging material 211 via a filling pipe 216.

The second to fifth forming rings 234-237 each have a forming roller which has a predetermined curved surface for deforming the packaging material 211 into a tubular shape. These forming rings deform the packaging material 211 in such a manner that the packaging material 211 is deformed in an increasing quantity toward downstream along the traveling direction.

The feed apparatus generally includes a pair of nip rollers disposed adjacent to the delivery unit and adapted to feed the packaging material 211 while nipping the packaging material 211 from front and rear sides; unillustrated crease rollers for forming creases on the packaging material 211 while the same is being rotated; a pair of nip rollers 248 disposed at the highest position of the filling apparatus and adapted to feed the packaging material 211 while nipping the packaging material 211 from front and rear sides; the first forming ring 240 which functions as an inversion roller; and unillustrated engagement portions formed integrally with corresponding unillustrated forming flaps and adapted to engage lugs formed on an unillustrated prototype container in the vicinity of lateral seal portions so as to move the prototype container and the packaging material 211 forward.

Notably, a preforming apparatus is composed of the first to fifth forming rings 240 and 234 to 237, the longitudinal sealing device 241, the tube guide roller 238, and the lateral sealing device, among others.

Next, the second to fifth forming rings 234 to 237 will be described.

The second forming ring 234 assumes a cylindrical shape and inverts the traveling web-like packaging material 211. The third forming ring 235 curves opposite side edges of the web-like packaging material 211; the fourth forming ring 236 brings the curved opposite side edges of the web-like packaging material 211 to each other such that the packaging material 211 assumes a shape having a substantially elliptical cross section; and the fifth forming ring 237 brings further close to each other the opposite side edges of the packaging material 211 having a substantially elliptical cross section so as to impart a tubular shape to the packaging material 211.

Next, the fourth forming ring 236 will be described.

In FIG. 19, reference numeral 236 denotes the fourth forming ring. The fourth forming ring 236 includes five forming rollers 221 and one counter pressure roller 222. The forming rollers 221 are rotatably supported by corresponding shafts 223, and the counter pressure roller 222 is rotatably supported by a shaft 224, thereby allowing travel of the tubular packaging material 211. For allowing this travel, each of the forming rollers 221 and the counter pressure roller 222 have surfaces 228 and 229 of arc-shaped section, respectively. The surfaces 228 and 229 are disposed adjacent to one another, thereby defining a circular space 230 at the center.

The shaft 224 is supported by a bracket 225. The bracket 225 is linked to an unillustrated compressed-air cylinder. Activation of the compressed-air cylinder impels the counter pressure roller 222 toward the packaging material 211 (rightward in FIG. 19).

Meanwhile, the first to fifth forming rings 240 and 234-237 guide and deform the packaging material 211 into a tubular shape. In the space 230 of the fifth forming ring 237, the packaging material 211 is formed into a tubular shape such that opposite side edges thereof overlap each other by a predetermined overlap quantity, whereby an overlap portion is formed.

In this case, upon variation in the overlap quantity, not only longitudinal sealing but also lateral sealing fails to be reliably performed, leading to occurrence of seal defect and failure to fold the packaging material 211 along creases. As a result, forming defect arises, and thus the appearance of a packaging container is impaired.

Particularly, in a lateral sealing device which employs ultrasonic sealing for laterally sealing the tubular packaging material 211, variations in overlap quantity are more likely to raise occurrence of seal defect at a lateral seal portion. For example, when the overlap quantity varies to increase, the overlap portion becomes too large to be received in a recess and projects from the recess. As a result, ultrasonic waves are not transmitted to the entire lateral seal portion, and ultrasonic sealing cannot be reliably performed, resulting in occurrence of seal defect at the lateral seal portion.

Thus, an unillustrated overlap quantity detection device is employed to detect an overlap quantity. The overlap quantity detection device functions in the following manner. An overlap portion is irradiated with light, and an overlap quantity is determined on the basis of light reflected from the overlap portion, or a predetermined sensor is used to detect an overlap quantity.

Upon variation in overlap quantity, in order to adjust the overlap quantity, a predetermined forming ring among the second to fifth forming rings 234-237, in the present embodiment, the fourth forming ring 236, which is the second furthermost downstream forming ring, is moved toward the downstream or upstream side in the traveling direction of the packaging material 211; i.e., vertically along the traveling direction of the packaging material 211. For achieving such movement, the fourth forming ring 236 is movably supported by an unillustrated predetermined moving mechanism and is linked to a compressed-air cylinder 239 which serves as a drive unit. The compressed-air cylinder 239 communicates with compressed air via an unillustrated control valve. The control valve is connected to an unillustrated control section.

Unillustrated overlap quantity adjustment processing means of the control section performs overlap quantity adjustment processing. Specifically, the overlap quantity adjustment processing means reads an overlap quantity detected by the overlap quantity detection device and controls the opening of the control valve so as to activate the compressed-air cylinder 239, thereby causing the fourth forming ring 236 to move vertically according to the overlap quantity.

For example, when the overlap quantity is too large, the fourth forming ring 236 is caused to move downward so as to weaken squeeze of the packaging material 211, thereby reducing the overlap quantity accordingly. When the overlap quantity is too small, the fourth forming ring 236 is caused to move upward so as to increase squeeze of the packaging material 211, thereby increasing the overlap quantity accordingly. Notably, in the present embodiment, among the second to fifth forming rings 234-237, the fourth forming ring 236 is moved. However, the fifth forming ring 237 may be moved. Furthermore, a plurality of forming rings may be moved. In this case, since the deformation quantity of the packaging material 211 can be divided among the forming rings, the packaging material 211 can be smoothly deformed.

In this case, upon variation in overlap quantity, the overlap quantity can be adjusted by the overlap quantity adjustment processing means of the control section, whereby not only longitudinal sealing but also lateral sealing can be reliably performed to thereby prevent occurrence of seal defect. Also, the packaging material 211 can be accurately folded along creases, thereby avoiding occurrence of forming defect and improving the appearance of a packaging container.

Also, an overlap quantity can be adjusted merely through movement of the fourth forming ring 236. Thus, even when the fourth forming ring 236 is to be manually moved, relevant work can be simplified. Employment of automatic movement can further simplify relevant work.

Since adjustment of overlap quantity does not require replacement of predetermined forming rings, stopping the running filling apparatus is not required. Thus, work for resuming operation of the filling apparatus is not required. Also, in an aseptic-type filling apparatus for producing aseptic packaging containers, sterility can be maintained.

The present invention is not limited to the above-described embodiments. Numerous modifications and variations of the present invention are possible in light of the spirit of the present invention, and they are not excluded from the scope of the preset invention.

INDUSTRIAL APPLICABILITY

The present invention can be applied to a filling apparatus for use in production of packaging containers.

The invention claimed is:

1. A filling apparatus comprising:
   (a) forming rings, respectively disposed at a plurality of positions spaced along a traveling path of a web-like packaging material, for deforming the web-like packaging material into a tubular shape, wherein the forming rings effect the deforming incrementally as the web-like packaging material moves downstream along the traveling path;
   (b) a longitudinal sealing device for longitudinally sealing opposite side edges of the tubular shaped packaging material;
   (c) a moving mechanism for moving one of said forming rings along the traveling path, in the direction of travel of the packaging material;
   (d) an overlap quantity detection device for detecting an overlap quantity of opposite side edges of the packaging material; and
   (e) overlap quantity adjustment processing means for causing the moving mechanism to move the one forming ring in the direction of travel of the packaging material according to the detected overlap quantity, thereby regulating the overlap quantity.

2. The filling apparatus of claim 1, wherein the moving mechanism moves the furthermost downstream forming ring among the forming rings.

3. The filling apparatus of claim 2, wherein the one forming ring is located upstream of the longitudinal sealing device along the traveling path.

4. The filling apparatus of claim 1, wherein the one forming ring is located upstream of the longitudinal sealing device along the traveling path.

* * * * *